(12) United States Patent
Gardner et al.

(10) Patent No.: US 12,106,430 B2
(45) Date of Patent: Oct. 1, 2024

(54) METHOD AND SYSTEM FOR DYNAMICALLY ESTIMATING LIGHT-SOURCE PARAMETERS FROM MULTIPLE IMAGES

(71) Applicant: DEPIX TECHNOLOGIES INC., Montreal (CA)

(72) Inventors: Marc-Andre Gardner, Québec (CA); Jean-François Lalonde, Québec (CA); Christian Gagne, L'ancienne-Lorettte (CA)

(73) Assignee: Depix Technologies Inc., Montreal (CA)

( * ) Notice: Subject to any disclaimer, the term of this patent is extended or adjusted under 35 U.S.C. 154(b) by 158 days.

(21) Appl. No.: 18/009,721

(22) PCT Filed: Jun. 14, 2021

(86) PCT No.: PCT/CA2021/050805
§ 371 (c)(1),
(2) Date: Dec. 10, 2022

(87) PCT Pub. No.: WO2021/248252
PCT Pub. Date: Dec. 16, 2021

(65) Prior Publication Data
US 2023/0245382 A1     Aug. 3, 2023

Related U.S. Application Data

(60) Provisional application No. 63/038,214, filed on Jun. 12, 2020.

(51) Int. Cl.
*G06T 15/50* (2011.01)
*G06V 10/60* (2022.01)
(Continued)

(52) U.S. Cl.
CPC ........... *G06T 15/506* (2013.01); *G06V 10/60* (2022.01); *G06V 10/7715* (2022.01);
(Continued)

(58) Field of Classification Search
CPC ... G06T 15/506; G06T 2215/12; G06V 10/60; G06V 10/7715; G06V 10/82; G06V 10/774
See application file for complete search history.

(56) References Cited

U.S. PATENT DOCUMENTS 10,902,670 B1 * 1/2021 Schied ................. G06T 15/506
2018/0253869 A1   9/2018 Yumer et al.
2021/0065440 A1   3/2021 Sunkavalli et al.

FOREIGN PATENT DOCUMENTS

WO     2020102771 A1    5/2020

OTHER PUBLICATIONS

Deep Parametric Indoor Lighting Estimation, Gardner Marc-Andre, Hold-Geoffroy Yannick, Sunkavalli Kalyan, Gagne Christian, Lalonde Jean-Francois, Conference Proceedings Article, 2019 IEEE/CVF International Conference on Computer Vision (ICCV), Oct. 27, 2019, IEEE, pp. 7174-7182 https://dx.doi.org/10.1109/ICCV.2019.00727.

(Continued)

*Primary Examiner* — Grace Q Li
(74) *Attorney, Agent, or Firm* — Hickman Becker Bingham Ledesma LLP

(57) ABSTRACT

An automated and dynamic method and system are provided for estimating lighting conditions of a scene captured from a plurality of digital images. The method comprises generating 3D-source-specific-lighting parameters of the scene using a lighting-estimation neural network configured for: extracting from the plurality of images a corresponding number of latent feature vectors; transforming the latent (Continued)

feature vectors into common-coordinates latent feature vectors; merging the plurality of common-coordinates latent feature vectors into a single latent feature vector; and extracting, from the single latent feature vector, 3D-source-specific-lighting parameters of the scene.

21 Claims, 13 Drawing Sheets

(51) Int. Cl.
  *G06V 10/77* (2022.01)
  *G06V 10/774* (2022.01)
  *G06V 10/82* (2022.01)
(52) U.S. Cl.
  CPC .......... *G06V 10/82* (2022.01); *G06T 2215/12* (2013.01); *G06V 10/774* (2022.01)

(56) References Cited

OTHER PUBLICATIONS

DeepLight: light source estimation for augmented reality using deep learning, Kan Peter, Kafumann Hannes, Visual Computer, May 7, 2019, Springer, Berlin, DE, ISSN 0178-2789, vol. 35, Nr.:6, pp. 873-883 https://dx.doi.org/10.1007/s00371-019-01666-x.

Robust Point Light Source Estimation Using Differentiable Rendering, Gregoire Nieto, Salma Jiddi, Philippe Robert, arXiv.org, Dec. 12, 2018, Cornell University Library, 201 Olin Library Cornell University Ithaca, NY 14853.

Learning to Predict Indoor Illumination from a Single Image, Marc-Andre Gardner, Kalyan Sunkavalli, Ersin Yumer, Xiaohui Shen, Emiliano Gambaretto, Christian Gagne, Jean-Francois Lalonde, arXiv.org, Apr. 1, 2017, Cornell University Library, 201 Olin Library Cornell University Ithaca, NY 14853.

* cited by examiner

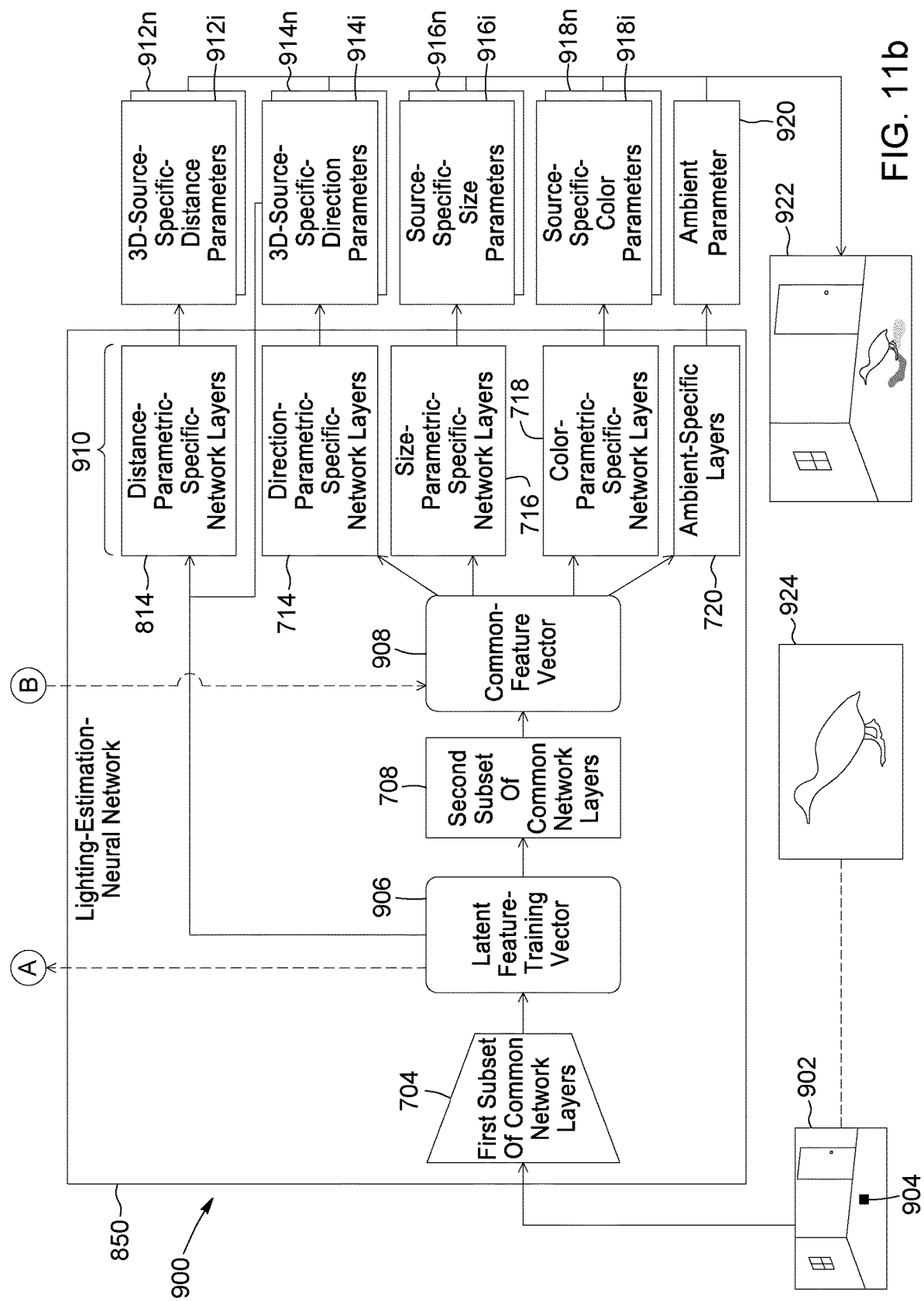

METHOD AND SYSTEM FOR DYNAMICALLY ESTIMATING LIGHT-SOURCE PARAMETERS FROM MULTIPLE IMAGES

RELATED APPLICATION

This application is a U.S. National Stage Patent Application filed under 35 U.S.C. § 371 of International Patent Application No. PCT/CA2021/050805, entitled "METHOD AND SYSTEM FOR DYNAMICALLY ESTIMATING LIGHT-SOURCE PARAMETERS FROM MULTIPLE IMAGES" and filed Jun. 14, 2021, which claims the benefit under 35 U.S.C. 119(e) of U.S. Provisional Patent Application No. 63/038,214 filed on Jun. 12, 2020, the contents of which are herein incorporated in their entirety by reference for all purposes.

TECHNICAL FIELD

The technical field generally relates to image data processing, and more particularly relates to systems and methods dynamically estimating light-source conditions from multiple images.

BACKGROUND

Digital imagery systems often portray digitally enhanced images or other scenes with visual effects. For example, some existing digital imagery systems render both real objects and computer-simulated objects in scenes that include lighting from light sources either within or outside of a field of view for digital images. Some digital imagery systems adjust the color, intensity, or other features of lighting from multiple light sources. When a digital image includes lighting from multiple light sources, a digital imagery system may need to solve complex problems to reflect spatially varying lighting from multiple sources—particularly for indoor digital images. Despite making significant advances, existing digital imagery systems exhibit limitations that inhibit such systems from quickly rendering objects at different positions and/or accurately and realistically rendering objects with spatially varying lighting.

To render digital images with lighting for a computer-simulated object, some conventional digital imagery systems recover geometry, reflectance, and illumination from a single digital image of an arbitrary object using hand-crafted priors for components of the digital image. In some cases, conventional digital imagery systems assume the geometry of indoor scenes based on known geometries. But both hand-crafted priors and assumed geometry often result in lighting parameters that unrealistically portray lighting conditions of computer-simulated objects in a digital image, particularly for scenes with light from multiple sources. Such systems often cannot illuminate virtual objects with lighting that matches that of a real physical scene.

In addition to unrealistic portrayals of lighting, some existing digital imagery systems solve complex computing problems or use overly complicated network architectures that slow down the output of lighting parameters. In some cases, for instance, existing digital imagery systems reconstruct a multi-view three-dimensional model of a digital image's geometry as a basis for generating lighting parameters. Further, some existing digital imagery systems apply a rendering-based optimization to estimate scene geometry and reflectance, detect light-source positions, and estimate light source intensities—but only by applying challenging inverse computing equations solved with heuristics.

Both reconstruction of a scene's geometry and computationally heavy inverse equations slow down the computational time in which such systems generate lighting parameters. As objects move or lighting changes within a physical environment, such digital imagery systems accordingly consume excessive time and user input to portray lighting for virtual objects in different positions or in different lighting conditions.

SUMMARY

According to an aspect of the present invention, a computer-implemented method is provided for estimating lighting conditions of a scene captured from a plurality of digital images, where the scene can be illuminated by one or more light sources. The method comprises different steps, including a step of accessing the plurality of digital images of the scene. The plurality of images share substantially the same projection center. The method also comprises a step of generating, using a lighting-estimation neural network, lighting parameters of the scene comprising at least 3D-source-specific-lighting parameters. The lighting-estimation neural network is configured for extracting from the plurality of images a corresponding number of latent feature vectors. The latent feature vectors can be extracted using instances of a first subset of common network layers of the lighting-estimation neural network. The lighting-estimation neural network is also configured to transform the latent feature vectors into common-coordinates latent feature vectors using instances of a latent-rotation neural network. The common coordinates are relative to the scene. . The lighting-estimation neural network is also configured to merge the plurality of common-coordinates latent feature vectors into a single latent feature vector. The lighting-estimation neural network is also preferably configured to extract, from the single latent feature vector, a common-feature vector, using a second subset of the common network layers of the lighting-estimation neural network., The lighting-estimation neural network then generates the lighting parameters of the scene by inputting the common-feature vector through a plurality of parametric-specific-network layers of the light-estimating neural network, which can predict or estimate the 3D-source-specific-lighting parameters of the light sources detected by the lighting-estimation neural network.

According to some embodiments, the step of accessing the plurality of digital images comprises receiving N digital images of the scene, where each digital image has been captured at an azimuth angle $\theta_N$. One of said digital images is a reference image with a reference azimuth $\theta_0$. Further, the step of extracting the latent feature vectors comprises inputting the N digital images into N instances of the first subset of common network layers, and generating therefrom N latent feature vectors. One of said latent feature vectors is a reference latent feature vector. The step of transforming the latent feature vectors into common-coordinates latent feature vectors comprises inputting N−1 latent feature vectors and their associated azimuth angles relative to the reference azimuth $\theta_0$ into respective instances of the latent-rotation neural network, whereby the transformed N−1 latent feature vectors and the reference feature vector, result in N common-coordinates latent feature vectors. Also, the step of merging the plurality of common-coordinates latent feature vectors into a single latent feature vector comprises inputting the N common-coordinate latent feature vectors into the pooling layer of the light-estimating neural network.

According to some embodiments, the computer-implemented method comprises receiving a request for rendering a virtual object within one of the digital images at a given position. The method comprises rendering at least one modified image of the plurality of digital images, the modified image comprising the virtual object at the given position in said image, the virtual object being illuminated according to the lighting parameters.

According to some embodiments, the first subset of the common network layers comprises an encoder neural network.

According to some embodiments, the encoder neural network is based on a pre-trained DenseNet or ResNet architecture.

According to some embodiments, the latent-rotation neural network comprises at least one fully-connected layer of a size matching a size of the latent feature vectors.

According to some embodiments, each fully-connected layer is followed by a batch normalization and uses an Exponential Linear Unit (ELU) or a Rectified Linear Unit (ReLU) activation function.

According to some embodiments, the azimuth angles $\theta_N$ of the images are determined based on image information provided by the image-capture device used for capturing the digital images.

According to some embodiments, the azimuth angles $\theta_N$ of the digital images are estimated using a plurality of instances of an angle-estimation neural network.

According to some embodiments, the angle-estimation neural network comprises a slim angle-estimation network comprising fully-connected layers. Estimating the azimuth angle $\theta_N$ of a given one of the digital images comprises inputting the corresponding latent feature vector of said image and the reference latent feature vector to the trained slim angle-estimation network.

According to some embodiments, the angle-estimation neural network comprises a full angle-estimation network based on a convolutional neural network (CNN) architecture with fully-connected layers. Estimating the azimuth angle $\theta_N$ of a given one of the digital images comprises inputting into the trained full angle-estimation neural network the corresponding latent feature vector of said image, the reference latent feature vector associated to the reference image, and said given one image and said reference image.

According to some embodiments, the merging of the plurality of common-coordinates feature vectors is performed by using a pooling layer of the light-estimating neural network.

According to some embodiments, the pooling layer is a maximum pooling layer or an average pooling layer, and comprises one or more fully-connected layers.

According to some embodiments, the parametric-specific-network layers generate, for each of the light sources detected by the lighting-estimation neural network, at least one of a 3D-source-specific-distance parameter estimating a distance of the light source from a reference point, a 3D-source-specific-direction parameter estimating a direction of the light source with respect to the reference point, a source-specific-size parameter estimating a size of the light source, and a source-specific-color or intensity parameter estimating a color of the light source.

According to some embodiments, the lighting parameters further comprise an ambient parameter representative of an overall illumination of the digital images when light sources are removed, and wherein the parametric-specific-network layers generate the ambient parameter.

According to some embodiments, the parametric-specific-network layers are fully-connected specific-network decoder layers, and wherein output sizes of the parametric-specific-network layers vary according to parameter type and a number of light sources detected.

According to some embodiments, the 3D-source-specific-direction, source-specific-size and source-specific-color parameters corresponding to any one of the light sources are generated based on the common-feature vector.

According to some embodiments, the 3D-source-specific distance parameter corresponding to one of the light sources is generated based on the common latent feature vector and the 3D-source-specific-direction parameter corresponding to the light source.

According to some embodiments, the method further comprises a step of rendering at least one modified digital image comprising a virtual object illuminated according to the generated 3D-light parameters.

According to another aspect, a computer-implemented method is provided for training a lighting-estimation neural network. The computer-implemented method comprises acquiring a plurality of High Dynamic Range (HDR) training panorama images and sampling, from each HDR training panorama images, a set of Low Dynamic Range (LDR) images, wherein the set of LDR images sampled from each HDR training panorama image is referred to as "a sampling group", and wherein the plurality of "sampling groups" form a training dataset.

In possible implementations where the lighting-estimation neural network has not already been trained on single images, the method can comprise training, in a first step, the lighting-estimation neural network with a training dataset, wherein parametric-specific-network layers corresponding to 3D-source-specific-distance parameters are deactivated such that no gradient flows through it, to detect the different light sources. The computer-implemented method further comprises training, in a second step, the lighting-estimation network with the training dataset, wherein the parametric-specific-network layer corresponding to the 3D-source-specific-distance parameter is activated, and wherein neural weights associated to a first subset and a second subset of common layers of the lighting-estimation network are fixed to avoid modification, so as to determine the distance of each light source from a reference point and the specific parameters associated to each of the light sources.

In some embodiments, sampling of the LDR images can be performed according to one of random sampling, wherein the number of LDR images are cropped according to a uniform or other predetermined distribution of the azimuth angles from the panorama images, augmented-reality sampling, wherein the number of LDR images are cropped respecting a maximum azimuth distance relative to a first cropped LDR image, or dual camera sampling, wherein two images correspond to front and back images of an image-capturing device, the images having an azimuth angle difference of a known angle, such as 90°, 180°, as examples only.

In some embodiments, the computer-implemented method further comprises training a latent-rotation neural network, using rotated training images for which the azimuth angles are known.

In some embodiments, the computer-implemented method further comprises training a slim angle-estimation network separately, by using an already trained lighting-estimation neural network.

In some embodiments, the computer-implemented method further comprises training a full angle-estimation network separately, by using an already trained lighting-estimation neural network.

According to another aspect, a system is provided for estimating the lighting conditions of a scene, expressed as lighting parameters comprising at least three-dimensional (3D) -source-specific-lighting parameters. The system comprises a module for accessing a plurality of digital images of a scene sharing substantially the same projection center. The system further comprises a trained lighting-estimation neural network for generating the 3D-source-specific-lighting parameters of the scene. The trained lighting-estimation neural network is configured to extract a plurality of latent feature vectors, using a plurality of instances of a first subset of common network layers of the lighting-estimation neural network, corresponding to the plurality of digital images. The lighting-estimation neural network is further configured to transform, using a plurality of instances of a trained latent-rotation neural network, the plurality of latent feature vectors into common-coordinates latent feature vectors, wherein the common coordinates are relative to the scene, and to merge, using a pooling layer, the plurality of common-coordinates latent feature vectors into a single latent feature vector. The lighting-estimation neural network is further configured to extract, using a second subset of the common network layers of the lighting-estimation neural, a common feature vector from the single latent feature vector, and to generate, using a plurality of parametric-specific-network layers, the 3D-source-specific-lighting parameters of the scene for each of light sources predicted by the lighting-estimation neural network.

According to some embodiments, the lighting parameters further comprise an ambient parameter, and wherein step v. comprises generating the ambient parameter.

According to some embodiments, the system further comprises a rendering module, to render at least one modified image of the plurality of digital images, the modified image comprising a virtual object at a given position in said image, the virtual object being illuminated according to the lighting parameters.

According to some embodiments, the system further an angle-estimation module for estimating the azimuth angles $\theta_N$ of the images using a plurality of instances of angle-estimation networks.

According to another aspect, there is provided a non-transitory storage medium comprising processor-executable instructions to perform any variant of the methods described above.

According to another aspect, there is provided a computer-implemented method for estimating lighting conditions of a scene captured from a plurality of digital images, the scene being illuminated by one or more light sources. The method comprises generating 3D-source-specific-lighting parameters of the scene using a lighting-estimation neural network configured for extracting from the plurality of images a corresponding number of latent feature vectors, transforming the latent feature vectors into common-coordinates latent feature vectors, merging the plurality of common-coordinates latent feature vectors into a single latent feature vector, and extracting, from the single latent feature vector, 3D-source-specific-lighting parameters of the scene.

BRIEF DESCRIPTION OF THE FIGURES

Other features and advantages of the present invention will be better understood upon reading the following non-restrictive description of possible implementations thereof, given for the purpose of exemplification only, with reference to the accompanying drawings in which:

FIGS. 11a-b is an illustration of a lighting estimation system using a trained lighting-estimation neural network to generate lighting parameters for rendering a modified image by integrating a virtual object to the digital image, according to a possible embodiment.

Figure 1:
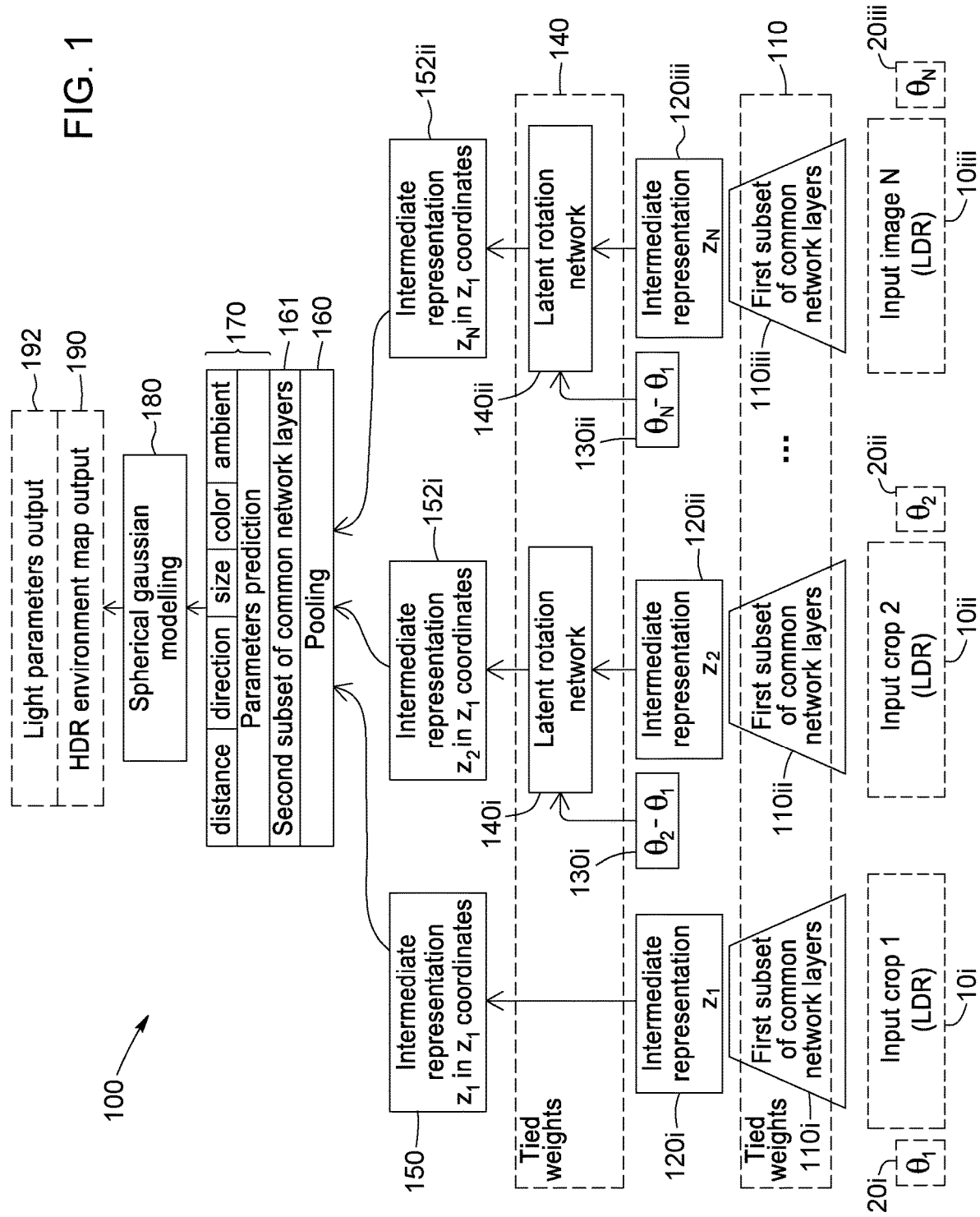
FIG. 1 is a schematic illustration of a lighting-estimation neural network, according to a possible embodiment.

It should be noted that the appended drawings illustrate only exemplary embodiments of the invention and are therefore not to be construed as limiting of its scope, for the present application may admit to other equally effective embodiments.

DETAILED DESCRIPTION

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and interactions between elements.

In regard generally to rendering, existing techniques for rendering of objects within a scene using illumination of the scene and for extracting illumination information from a scene often include manual intervention, specialized hardware or limiting constraints with regard to the scene. For example, current techniques may require specific hardware, assume a constrained physical model, require the definition of hand-crafted lighting cues, imply some hypothesis about real-world lighting, or learn a simplified version of the problem by reducing the diversity of its inputs.

Therefore, the method, system and software application described herein at least solve computing problems related to the extraction and estimation of illumination information from a scene. The method advantageously reduces the need for specialized hardware and manual intervention, and improves performances related to extracting and estimating the illumination information of a scene.

The lighting estimation system, method and software application described in the present application relates to the extraction of illumination information (or lighting conditions) of digital images. In possible implementation, the lighting conditions, expressed as 3D lighting parameters, or lighting parameters, can be used for rendering modified images comprising a virtual object that is integrated into the images of a scene at a given position, where the virtual object is illuminated using the lighting parameters, thereby improving the integration of the virtual object within the digital image. The lighting parameters can comprise 3D-source-specific-lighting parameters, associated to respective light sources detected in the digital images, and an ambient parameter. The lighting-estimation system, method and software described hereinbelow is particularly adapted for predicting or determining light sources of in a scene depicted in a plurality of digital images, and for estimating lighting parameters corresponding to and/or associated with the light sources. An advantage of the lighting-estimation system is that it can be applied to any real-world usage and scene. While possible applications of the lighting-estimation system comprise the rendering of modified images and of virtual objects within one or more digital images, the proposed system may be used in other applications, such as image matching and camera or robot localization.

The present patent application describes one or more embodiments of a lighting-estimation system that uses a lighting-estimation neural network to detect light sources illuminating digital images and estimate lighting parameters specific to the detected light sources. The lighting-estimation system provides an advantage of being capable of estimating light sources that are within or outside of the digital images of a scene and detecting multiple light sources when a scene comprises such multiple light sources. The estimated lighting parameters may be applied, through an illumination engine for instance, to a virtual object, in order to render the virtual object within a scene with a more realistic lighting.

According to an embodiment, the lighting-estimation system identifies a request to extract illumination information from a scene. To extract such illumination information, a plurality of digital images of the scene is provided to the lighting-estimation system. The lighting-estimation system comprises a neural network, which can extract latent feature vectors of the digital images, using for example a first subset of common network layers thereof. A "latent feature vector" is a vector that contains "hidden" or "not directly-observable" features embedded in a digital image. In the case where a single image was analyzed, as described in U.S. patent application Ser. No. 16/558,975, incorporated herein by reference, the latent feature of the single image was further processed by a second subset of common network layers into a common-feature vector having a smaller size than the latent feature vector. The common-feature vector was then inputted into specialized network layers which generated 3D-source-specific parameters and an ambient parameter, together forming the lighting parameters. The 3D-source-specific parameters and the ambient parameter included the illumination information. In the present case, where two or more digital images are used, the latent feature vectors of each image are merged into a single latent feature vector, before being transformed into a common-feature vector. In addition, before merging the latent feature vectors, they must be transformed to be represented in coordinates of a common reference space, as will be explained in more details below.

According to an embodiment, the lighting-estimation system comprises a latent-rotation neural network which can transform the latent feature vectors of each of the digital images into common-coordinates feature vectors, wherein the common-coordinates feature vectors have a similar frame of reference, also referred to as the azimuth orientation of the scene. The advantage of the latent-rotation neural network is that each digital image of the scene may contribute in estimating lighting parameter of the light sources with more precision than what would be possible using a single digital image.

In a possible implementation, for instance, the lighting-estimation system identifies a request to render a modified digital image by adding a virtual object at a designated position within the digital image of a set of digital images. The digital images may share substantially a same projection center. In response to the request, the lighting-estimation system can render a modified digital image comprising the virtual object at the designated position illuminated according to the lighting parameters estimated by the lighting-estimation neural network, using the set of digital images.

In certain embodiments, the lighting-estimation neural network can comprise a lighting-estimation neural network trained to estimate lighting parameters of a single image, where the pre-trained lighting-estimation neural network is further trained to generate light parameters using multiple digital images as inputs. The lighting-estimation system can train such a lighting-estimation neural network. The lighting-estimation system can also train the latent-rotation neural network to generate common-coordinates latent feature vectors. Optionally, the lighting-estimation system can also train an angle-estimation network, separately from any other training. An advantage of such a training is that it avoids propagating estimation errors of the angle-estimation network through the lighting-estimation neural network.

In certain embodiments, the lighting-estimation system can start from scratch, and train a single-image lighting-estimation neural network to generate the lighting parameters. To avoid the challenges of mismatching lighting parameters with the wrong light source, for instance, the lighting-estimation system can train the lighting-estimation neural network in two stages. In a first training stage, for example, the lighting estimation system can apply a differentiable-projection layer to the 3D-source-specific-lighting parameters to project a predicted environment map corresponding to a group of digital training images of a scene and compare the environment map to a ground-truth-environment map corresponding to the scene. By comparing the predicted environment map to the ground-truth-environment map, the lighting estimation system determines an environment-map loss. Through multiple training iterations of the first training stage, the lighting estimation system modifies internal parameters of the lighting-estimation neural network based on such environment-map losses until a point of convergence.

In a second training stage, for example, the lighting-estimation system can compare subsequent predicted lighting parameters to ground-truth lighting parameters corresponding to a subsequent group of digital training images of a scene to determine lighting parameter losses. Through multiple training iterations of the second training stage, the lighting estimation system modifies internal parameters of the parametric-specific-network layers based on the lighting parameter losses until a point of convergence—while simultaneously maintaining internal parameters of the common network layers.

In the present description, the term "scene", also referred to as "environment", refers to any physical environment, whether indoors or outdoors, such as a room, a kitchen or a backyard. The scene is preferably captured using panoramic images.

The term "feature vector" refers to a multi-dimensional vector representing features of a digital image. Whereas a latent feature vector encodes or otherwise represents features of a digital image, a common feature vector encodes or otherwise represents abbreviated or modified features of the digital image. In some embodiments, for example, a latent feature vector may consist of a 3,072-dimensional vector representing an RGB image. In some cases, a common feature vector may consist of a 512-dimensional vector based on (or extracted from) the 3,072-dimensional vector.

The term "projection center" refers to a fixed point within a scene from which a capturing device may be used to acquire digital images of the scene. While the azimuth angle of captured digital images may change, the projection center stays substantially at the same point in space. For example, a substantially similar projection center may be defined as having digital images translated less than a meter from each other.

The terms "encoder layers", "pooling layers" and "fully-connected layers" refer to layers of neural network architectures. The layers of the encoder neural network generally encode data into feature vectors or feature points. The pooling layers can be used to reduce a vector size while keeping important features of the input or to merge different vectors of equal size into a single vector of the same size, as examples only. A fully-connected layer generally identifies features using weights that can be tuned with training.

The term "neural network", also referred to as "artificial neural network", refers to a machine-learning model (or set of algorithms) that is based on a collection of connected nodes (also referred to as "artificial neurons") which are structured in layers. Nodes of a given layer are interconnected to nodes of neighboring layers, and weights are assigned to the connections between the nodes. There exist different neural network architectures, including convolutional neural networks and recurrent neural networks, for example. More specific examples of neural network architectures particularly adapted for image processing include the DenseNet and the Resnet architectures. In the exemplary implementation described in more detail below, the lighting parameter estimation network is a DenseNet-121 architecture pre-trained on ImageNet, a known image database, but different types of network architectures can be used as well, such as ResNet for example.

As used in this disclosure, the term "digital image" refers to a digitally rendered image or a depiction of objects. For example, in some embodiments, a digital image depicts a realistic scene from a particular viewpoint. Such a digital image may be a two-dimensional LDR image for example. Regardless of format, the digital image may include depictions of light from multiple light sources, any one of which may be within or outside a digital image's field of view. For example, a digital image may depict a real indoor room containing walls, a floor, and furniture with light emanating from a lamp and from a window, which may be visible or not in the image. As discussed further below, a digital image may be modified to include a virtual object in an adjusted or modified digital image.

Relatedly, the term "virtual object" refers to a computer-generated-graphical object that may not exist in the physical world. For example, a virtual object may include an object created by a computer for use within a digital imagery application. Such a virtual object may be, but is not limited to, virtual accessories, animals, characters, clothing, cosmetics, footwear, fixtures, furniture, furnishings, hair, people, physical human features, vehicles, or any other graphical object created by a computer. This disclosure generally uses the word "virtual" to designate specific virtual objects (e.g., "virtual pillow" or "virtual shoe"), but generally refers to real objects without the word "real" (e.g., "bed," "couch").

The term "processing device" as used in the following description encompasses computers, servers and/or specialized electronic devices which receive, process and/or transmit data. A "processing device" includes processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data. Steps of the proposed method are implemented as software instructions and algorithms, stored in computer memory and executed by processors. It should be understood that computers and/or computing devices are required to implement the proposed system, and to execute the proposed method.

Of course, numerous modifications could be made to the embodiments described above without departing from the scope of the present disclosure.

Estimating Lighting Parameters from Multiple Digital Images

FIG. 1 schematically represents a possible embodiment of a lighting-estimation neural network. A plurality of images 10$i$, 10$ii$ and 10$iii$ with associated azimuth angles 20$i$, 20$ii$, 20$iii$ correspond to digital images of a scene, captured from a generally similar projection center. The azimuth angles 20$i$, 20$ii$, 20$iii$ correspond to the orientation of the digital images within the scene. For example, the digital images may be three images of a room, wherein the azimuth angles of the images are 0°, 45° and 90°, and the image is chosen as a reference image 10$i$, corresponding to angle 0°. The reference image is defined arbitrarily as a first digital image and the corresponding azimuth angle 20$i$ is used as a reference azimuth angle for all other digital images, but of course, other methods can be used as well. In this example, reference image 10$i$ has a corresponding latent feature vector 120$i$, referred to as a "reference feature vector", as described below. The plurality of images may originate from different applications, such as from augmented-reality applications, or applications such as LivePhotos™ by Apple™ or Motion Photos™ by Samsung™, where a short video is captured for each photo, as examples only.

The digital images are inputted into the lighting-estimation neural network 100, wherein instances 110$i$, 110$ii$ and 110$iii$ of a first subset of common layers 110 of the lighting-estimation neural network are used to encode features of the digital images into latent feature vectors 120*i*, 120*ii*, 120*iii*. In a possible embodiment, the first subset of common layers 110 can be an encoder neural network. For example, the encoder neural network can be based on a pre-trained DenseNet or a ResNet architecture. The number of instances of the first subset of common layers 110, and consequently the number of latent feature vectors, can correspond to the number of digital images inputted into the lighting-estimation neural network. The latent feature vectors have similar sizes but not necessarily a similar coordinate reference because the azimuth angles 20*i*, 20*ii*, 20*iii* define different orientations of the digital images from the projection center. All latent feature vectors and associated azimuth deltas or differences ({120*ii*, 130*i*}, {120*iii*, 130*ii*}) other than the reference latent feature vector 120*i*, are processed by corresponding instances 140*i*, 140*ii* of a latent-rotation neural network 140. An azimuth delta (or azimuth difference) is defined as a difference between the azimuth angle of a digital image and the reference azimuth angle of the reference digital image. In some cases, the azimuth delta between two captured images is preset and can be provided by on-board sensors (such as inertial measurement units (IMUs) part of the image-capturing device. Alternatively, the azimuth angle of a digital image can be determined based on image information provided by the image-capture device used for capturing the digital image. The angles can also be provided by other means, such as feature-matching across the images. In possible embodiments, the latent-rotation neural network has been previously trained to output a latent feature vector having common coordinates with the reference latent feature vector 120*i*. Once processed through the different instances of the latent rotation network, the transformed latent feature vectors 152*i*, 152*ii* and the reference latent feature vector 120*i* are expressed within the same reference coordinates (in this case the coordinates of vector 120*i*) and can be referred to as common-coordinates latent feature vectors 150, 152*i*, 152*ii*. Of course, any one of set of digital images can be used as the reference image. It is also possible to use another object as the reference point, and in that case the coordinates of all of the digital image can be expressed relative to that reference point.

In one possible implementation, the latent-rotation neural network can comprise at least one fully-connected layer having a size corresponding to the size of the latent feature vectors. For example, the latent-rotation neural network can comprises two fully-connected layers. Each of the fully-connected layer can use an Exponential Linear Unit (ELU) or an Rectified Linear Unit (ReLU) activation function and can be followed by a batch normalization, as an example only.

Figure 3:
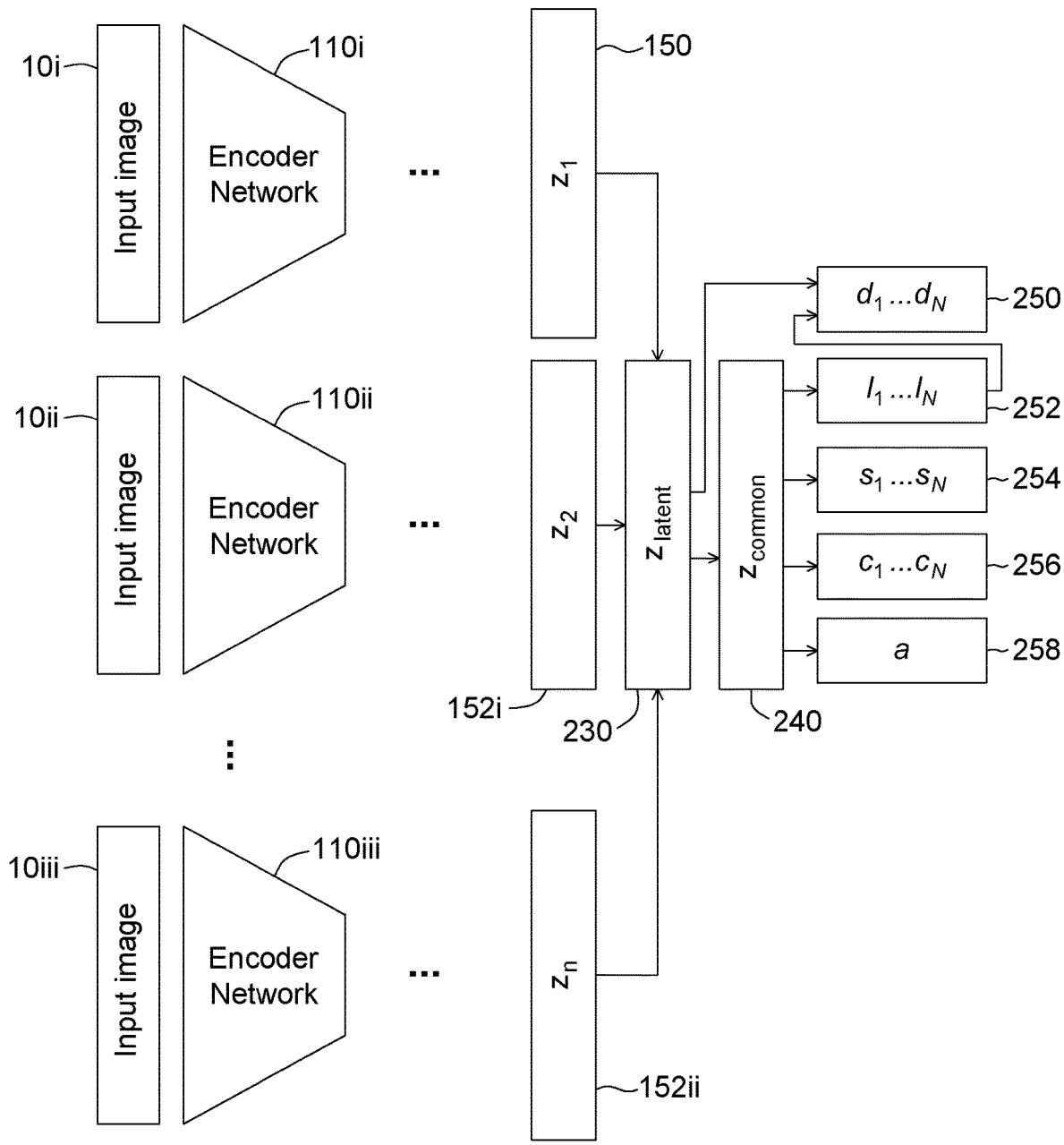
FIG. 3 is a schematic illustration of a lighting-estimation neural network including parametric-specific-network layers, according to a possible embodiment.

Still referring to FIG. 1, and to FIG. 3, the common-coordinates latent feature vectors 150, 152*i*, 152*ii* are next merged into a single latent feature vector (identified as 230 in FIG. 3). Different merging techniques can be used. In the example provided, the common-coordinates latent feature vectors 150, 152*i*, 152*ii* are pooled to obtain the single latent feature vector 230. The pooling layer 160 is used for merging the common-coordinates latent feature vectors. The pooling layer 160 may be either one of a maximum pooling layer or an average pooling layer. Preliminary experiments have shown that a maximum pooling operator provided better performances and robustness over the average pooling operator, but both types of poolers can be considered. The pooling layer can comprise at least one fully-connected layers. An advantage of merging the common-coordinates latent feature vectors is that is allows the network to work with a variable number of images.

Still referring to FIGS. 1 and 3, the single latent feature vector 230 is further processed by a second subset of the common network layers 161. The second subset of the common network layers 161 are trained to output a common-feature vector (identified as 240 in FIG. 3) having a vector size smaller than the vector size of the single latent feature vector 230. For example, in an embodiment, the single latent feature vector 230 may comprise 3072 dimensions while the common-feature vector 240 comprises 512 dimensions. Parametric-specific-network layers 170 use the common-feature vector 240 as an input and extract 3D-source-specific-lighting parameters and an ambient parameter, referred to as lighting parameters 192, associated with light sources estimated by the lighting-estimation neural network. Those lighting parameters 192 are advantageously used for rendering a virtual object into a digital image or rendering a modified digital image having the virtual object illuminated according to the generated lighting parameters, thereby improving the integration of the virtual object into the digital image. The rendered modified digital image can be displayed onto displaying means, such as a computer screen, a smartphone screen, and in a virtual-reality head-set, as examples only. In some embodiments, the lighting-estimation neural network 100 can further process the lighting parameters through a spherical gaussian representation 180 and create an HDR environment map output 190. For example, the HDR environment map output 190 can be used when training the lighting-estimation neural network. It will be understood that the step of processing the lighting parameters through the spherical gaussian representation 180 and create an HDR environment map output 190 is not necessary.

The parametric-specific-network layers 170 may comprise distance-parametric-specific-network layers, direction-parametric-specific-network layers, size-parametric-specific-network layers, color-parametric-specific-network layers, and ambient-specific layers. Referring to FIG. 3, the parametric-specific-network layers 170 may generate 3D-source-specific-lighting parameters comprising 3D-source-specific-distance parameters 250, 3D-source-specific-direction parameters 252, source-specific-size parameters 254, source-specific-color (or intensity) parameters 256, and an ambient parameter 258, the 3D-source-specific-lighting parameters and the ambient parameter together corresponding to the lighting parameters 192. The 3D-source-specific-distance parameters 250 provide an estimation of a distance of a particular light source from a reference point, for every detected light source. The 3D-source-specific-direction parameters 252 provide an estimation of a direction of a particular light source with respect to the reference point, for every detected light source. The source-specific-size parameters 254 provide an estimation of a size of a particular light source, for every detected light source. The source-specific-color parameters 256 provide an estimation of a color (or intensity) of a particular light source, for every detected light source. While the size of the 3D-source-specific-distance, 3D-source-specific-direction, source-specific-size and source-specific-color parameters 250, 252, 254 and 256 can vary according to the parameter type and the number of light sources estimated by the lighting-estimation neural network, the ambient parameter 258 typically has a fixed-size output because it is not linked to any particular light source and instead provides a parameter of the overall illumination of the digital images when light sources are removed. In possible embodiments, the parametric-specific-network layers 170 are fully-connected layers specific-network decoder layers.

Still referring to FIG. 3, the distance-parametric-specific-network layers generate the 3D-source-specific-distance parameters 250 based on the common latent feature vector 230 and from the 3D-source-specific-direction parameters 252. In contrast, the direction-parametric-specific-network layers, the size-parametric-specific-network layers, the color-parametric-specific-network layers and the ambient-specific layers generate corresponding parameters 252, 254, 256 and 258 based on the common-feature vector 240.

Figure 2:
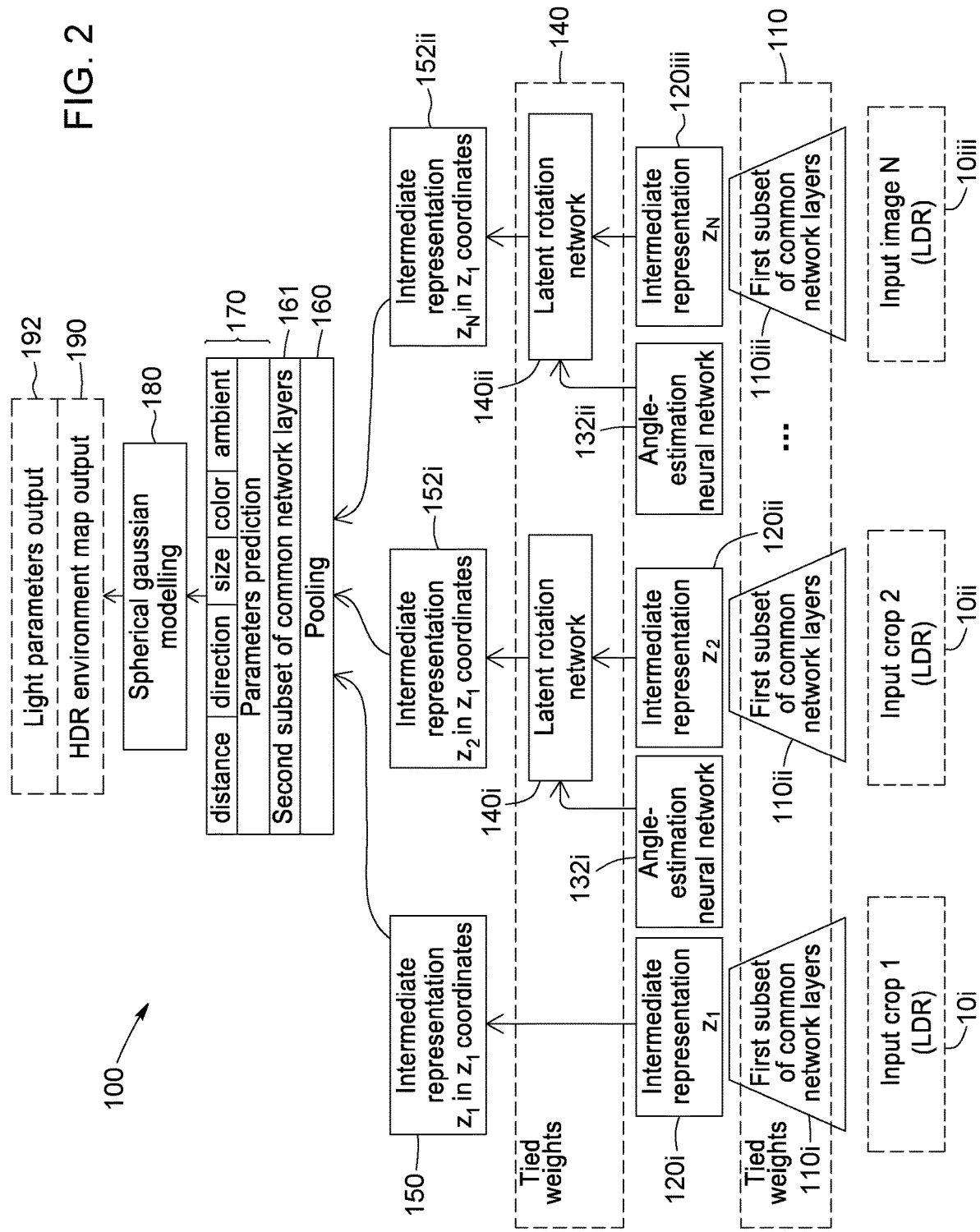
FIG. 2 is a schematic illustration of a lighting-estimation neural network including an angle-estimation network, according to another possible embodiment.

Referring now to FIG. 2, another possible embodiment of the lighting-estimation neural network is illustrated. The lighting-estimation neural network 102 is substantially similar as the lighting-estimation neural network 100 presented in FIG. 1, except for instances 132i, 132ii of an angle-estimation neural network that are used to estimate the azimuth angles or deltas between pairs of images, when such angles are unknown. When the azimuth angles 20i, 20ii, 20iii (identified in FIG. 1) associated with the digital images 10i, 10ii, 10iii are not known or not available to the lighting-estimation system, the angles may be estimated using different instances 132i, 132ii of a trained angle-estimation neural network. The delta (or difference) of azimuth angles can then be used as inputs to the latent-rotation neural networks. While different instances of the angle-estimation neural network are shown in FIG. 2, a single instance may also be used instead, wherein the azimuth angles between a given image and the reference image can be determined serially, as opposed to in parallel.

According to a possible implementation, the angle-estimation neural networks 132i, 132ii can be a slim angle-estimation network comprising fully-connected layers. The inputs of the slim angle-estimation network are 1) the latent feature vector 120ii or 120iii corresponding to the digital image 10ii or 10iii for which the azimuth angle or delta is estimated and 2) the reference latent feature vector 120i. Advantages of such a slim angle-estimation network is its simplicity and rapidity of training.

According to another possible implementation, a full angle-estimation network comprising a convolutional neural network (CNN) architecture, such as a ResNet encoder with fully-connected layers, can be used. The inputs of the full angle-estimation network can be 1) the digital image 10ii or 10iii for which the azimuth angle or delta is estimated and 2) the corresponding latent feature vector 120ii or 120iii of said image for which the azimuth delta is estimated, 3) the reference image 10i and 4) the corresponding reference latent feature vector 120i. An advantage of using such a full angle-estimation network is that when there is an overlap between two inputted digital images (as is common with augmented-reality applications), the full angle-estimation network is able to detect cues from this overlapping and provides more accurate results. As for cases where there is no overlap between the two inputted digital images, the full angle-estimation network is still able to determine the relative angle between the images, whereas most common approaches relying on an assumed overlap, cannot.

Figure 4:
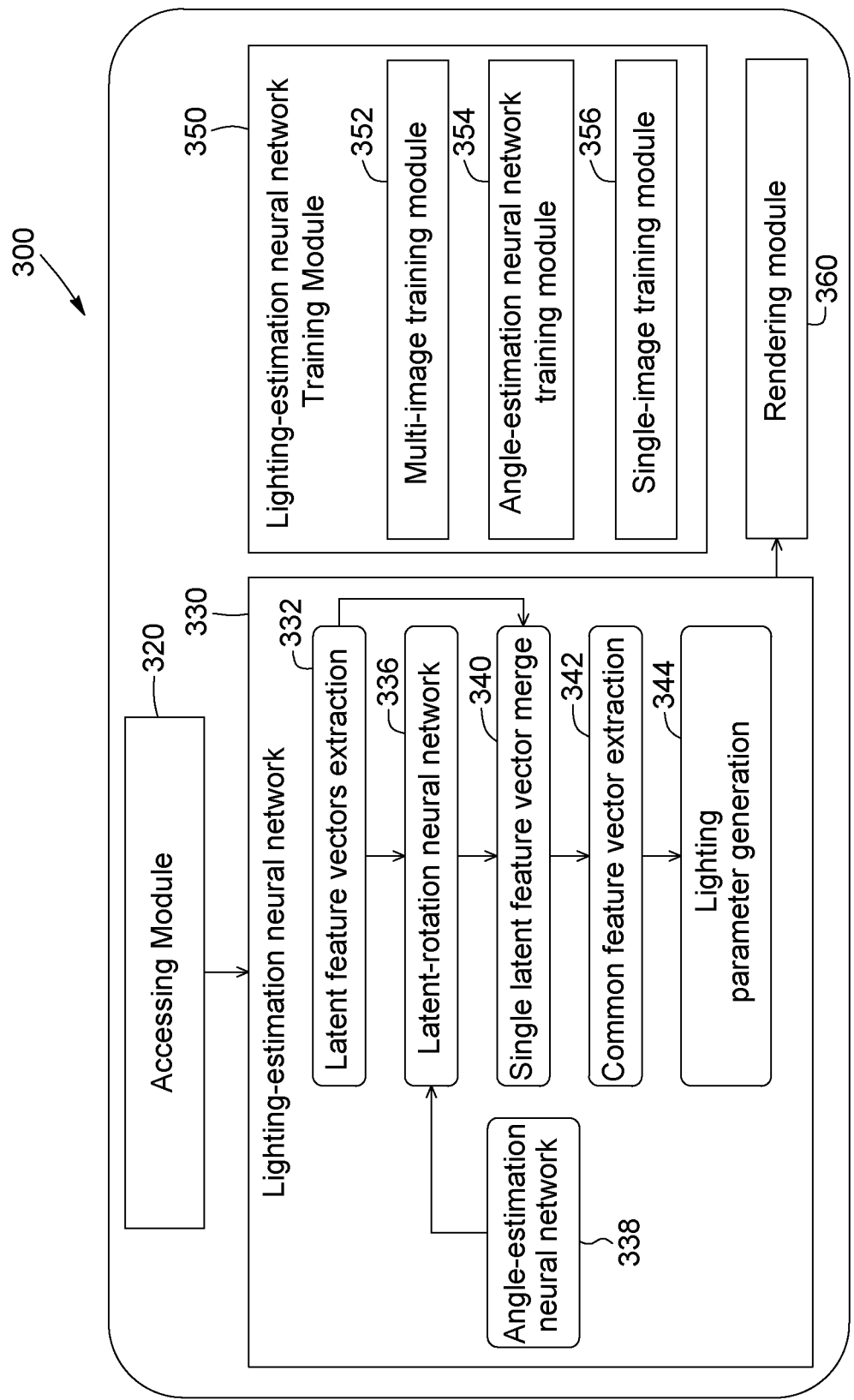
FIG. 4 is a schematic diagram of a lighting-estimation system comprising an accessing module, a lighting-estimation neural network and a corresponding training module, according to a possible embodiment.

FIG. 4 is a schematic representation of a lighting-estimation system 300, which can be implemented by one or more processing devices, provided with storage means (including volatile and non-volatile memory, such as RAM, ROM, CPU cache, Flash memory, hard drives, etc.) and processing means (such as CPUs and/or GPUs). The lighting-estimation system 300 comprises an accessing module 320 (to manage and access the digital images), a lighting-estimation neural network 330 (to generate the lighting parameters), a rendering module 360, and optionally a lighting-estimation neural network training module 350 (to train the lighting-estimation neural network). Since the lighting-estimation system 300 may be provided as already trained, the training module 350 is an optional module. In this exemplary embodiment, the accessing module 320 is configured to receive a request for rendering a modified image by incorporating a virtual object in a digital image of a scene, along with one or more digital images corresponding to the scene. The digital images share substantially a same projection center.

The accessing module 320 can alternatively be configured for accessing the digital images from a database, for example. The lighting-estimation neural network 330 is configured for processing the digital images and extracting predicted lighting parameters used by the rendering module 360. The lighting-estimation neural network 330 comprises a module 332 that extracts latent feature vectors from the digital images. The module 332 can comprise the first subset of common network layers. The lighting-estimation neural network 330 also comprises a latent-rotation neural network (or RotNet) module 336 for rotating at least some of the latent feature vectors in a common coordinate system, where the common coordinate system is relative to a scene depicted by the digital images. The lighting-estimation neural network 330 also comprises a merging module 340, such as an average pooler, for example, for merging the common-coordinates vectors corresponding to the digital images into a single latent feature vector. The lighting-estimation neural network 330 further comprises a common feature vector extractor module 342, for extracting a common-feature vector from the single latent feature vector. The common feature vector extractor module 342 can comprise the second subset of common network layers. The lighting-estimation neural network 330 further comprises a lighting parameter generator (or decoder) module 344, for generated the lighting parameters. The rendering module 360 is then configured to render the virtual object into a selected digital image, using the lighting parameters for illuminating the virtual object. In other words, the rendering module 360 renders a modified image having the virtual object integrated to the image. The rendering module 360 can include displaying the rendered modified image onto displaying means. The virtual object is positioned in the digital image according to a given position and illumination of the virtual object is generated using the lighting parameters. Optionally, the system can include an angle-estimation module 338 for determining an azimuth angle of a given image relative to a reference azimuth.

Still referring to FIG. 4, the lighting-estimation system 300 can further include a lighting-estimation neural network training module 350, for training the lighting-estimation neural network 330. The multi-image training module 352 performs the necessary steps for further training a pre-trained single-image lighting-estimation neural network (such as described in U.S. patent application Ser. No. 16/558,975) and for training the latent-rotation neural network 140, so as to estimate lighting parameters from a set of digital images. In a possible implementation, the lighting-estimation neural network training module 350 may further comprise an angle-estimation neural network training module 354, wherein the pre-trained lighting-estimation neural network 330 is used to train the angle-estimation neural network (132i, 132ii), as will be described in more detail below. For cases where the lighting-estimation neural network 330 needs to be trained from scratch, the training module 350 may further comprises a single-image training module 356.

Figure 5:
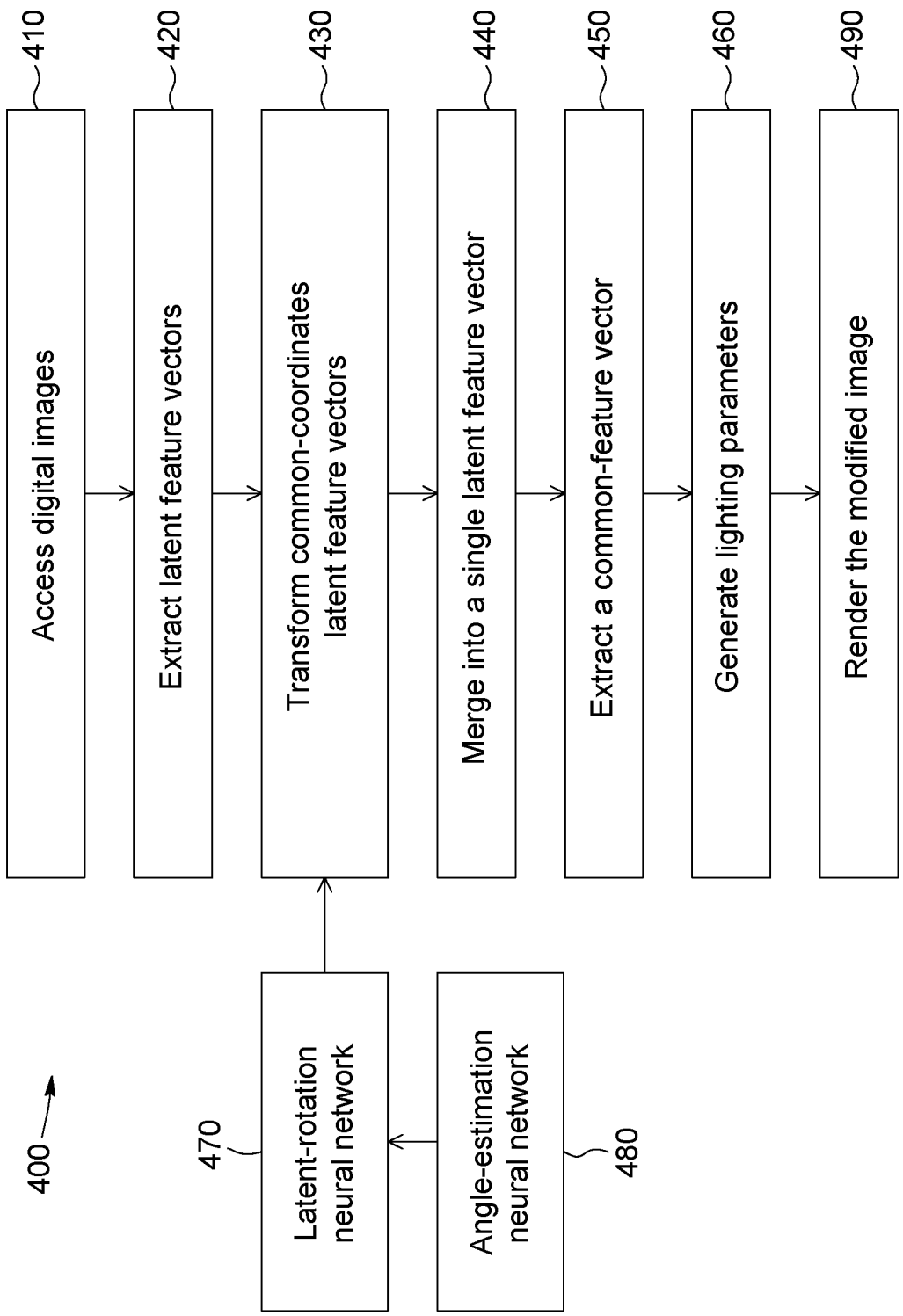
FIG. 5 is a flowchart of steps of the computer-implemented method, according to a possible embodiment.

FIG. 5 is a flow chart of the possible steps 410 to 480 of a proposed method associated to the lighting-estimation system 300. Step 410 comprises accessing the digital images following a request for rendering a virtual object, for example. Step 420 comprises extracting the latent feature vectors from the digital images. Step 430 comprises transforming the latent feature vectors into common-coordinates latent feature vectors using a latent-rotation neural network 470, and optionally using the angle-estimation neural network 480 for estimating the azimuth angles of the digital images, or azimuth deltas between the digital images. Step 440 comprises merging the common-coordinates latent feature vectors into a single latent feature vector. Step 450 comprises extracting a common-feature vector from the single latent feature vector. Step 460 comprises extracting, using parametric-specific-network layers, the lighting parameters from the common-feature vector. Step 490 comprises rendering the virtual object within a selected digital image and illuminating the virtual object using the lighting parameters, and in some embodiments, displaying the rendered image onto displaying means.

Figure 11A:
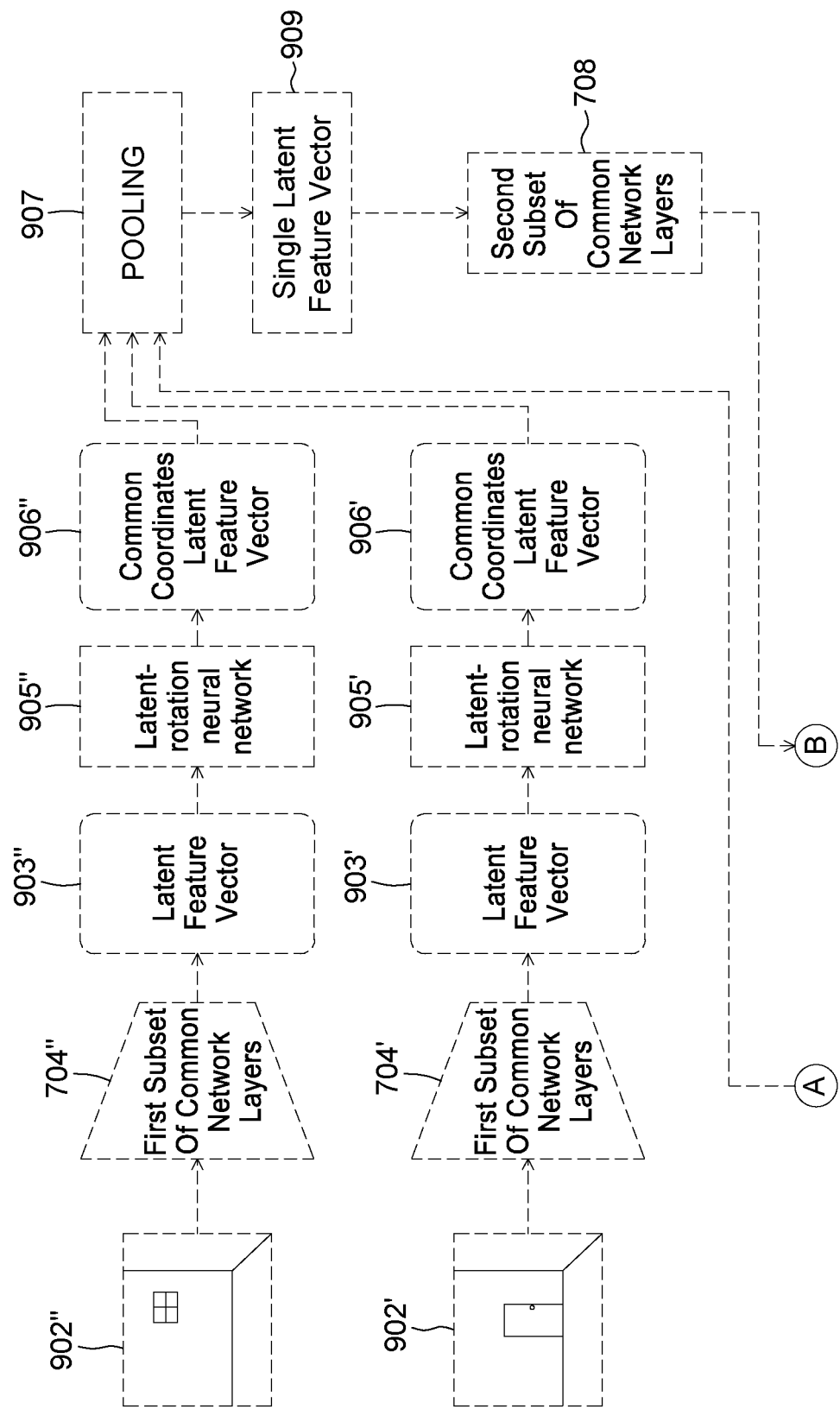

Turning now to FIG. 11a-b, a possible embodiment of a lighting estimation system 900 is illustrated, wherein a request for rendering a digital object within a digital image of a scene is made. The request includes a virtual object 924, a digital image 902 along with a position 904 within the digital image 902 indicating where the virtual object 924 is to be rendered. In this exemplary embodiment, a single digital image of the scene is processed by the lighting-estimation neural network 850 for simplification purposes. Therefore, the step of processing the latent feature vector with an instance of the latent-rotation neural network 140 may be skipped. However, in alternative embodiments where an arbitrary point, or object, of the digital image is used as the reference point, the latent feature vector may be processed using the latent-rotation neural network in order to express the coordinates of the digital image relative to that reference point. Further, in FIG. 11a, the dotted boxes and links represent a possible embodiment where three digital images 902, 902' and 902", sharing substantially a same projection center, are inputted to the system.

The digital image 902 is processed through a first subset of common network layers 704, where the digital image is encoded into a latent feature vector 906. The latent feature vector 906 is further processed in a second subset of common network layers 708, where a common-feature vector 908 is extracted from the latent feature vector 906. The common-feature vector is then processed through parametric-specific-network layers 910 to generate lighting parameters. For instance, the direction-parametric-specific-network layers 714, the size-parametric-specific-network layers 716, the color-parametric-specific-network layers 718 and the ambient-specific layers 720 generate, from the common-feature vector 908, corresponding 3D-source-specific-direction parameters 914$i$-914$n$, source-specific-size parameters 916$i$-916$n$, source-specific-color parameters 918$i$-918$n$, for n predicted light sources, and an ambient parameter 920. The distance-parametric-specific-network layers 814 further generate 3D-source-specific-distance parameters 912$i$-912$n$ from the latent feature vector 906 and the 3D-source-specific-direction parameters 914$i$-914$n$. The lighting parameters are then used as illumination information for rendering the virtual object 924 into the digital image 902, resulting in the rendering 922.

In the possible embodiment where three digital images 902, 902' and 902" are received by the lighting estimation system, additional instances 704' and 704" of the first subset of common network layers 704 may be used to process the additional digital images 902' and 902" to generate latent feature vectors 903' and 903". Latent feature vectors 903' and 903", generated from the first subset of common network layers 704' and 704" are then processed by instances 905' and 905" the latent-rotation neural network. This step allows for generating transformed latent feature vectors 906' and 906" which together with the latent feature vector 906 form common-coordinates latent feature vectors sharing common reference coordinates. The vectors 906, 906' and 906" are processed by a pooling layer 907 to generate a single latent feature vector 909. The single latent feature vector 909 is processed by a second subset of common network layers, generating the common feature vector 908. The rest of the steps are similar to an embodiment having a single digital image as an input, as detailed above.

It will be understood that a serial approach can be taken to processing the digital images instead of the parallel approach detailed hereinabove without departing from the present application. In other words, only one instance of the layers 704, 708 and latent-rotation neural network 905' can be used to process the digital images.

Training of a light estimation neural network for multiple images

In a possible embodiment, the lighting-estimation neural network shown in FIGS. 1 to 5 is based on a pre-trained single-image lighting-estimation neural network. Using a multi-image training, the single-image lighting-estimation neural network is then trained in order to create the lighting-estimation neural network. The multi-image training may include training the latent-rotation neural network and tuning the parametric-specific-network layers.

Figure 6:
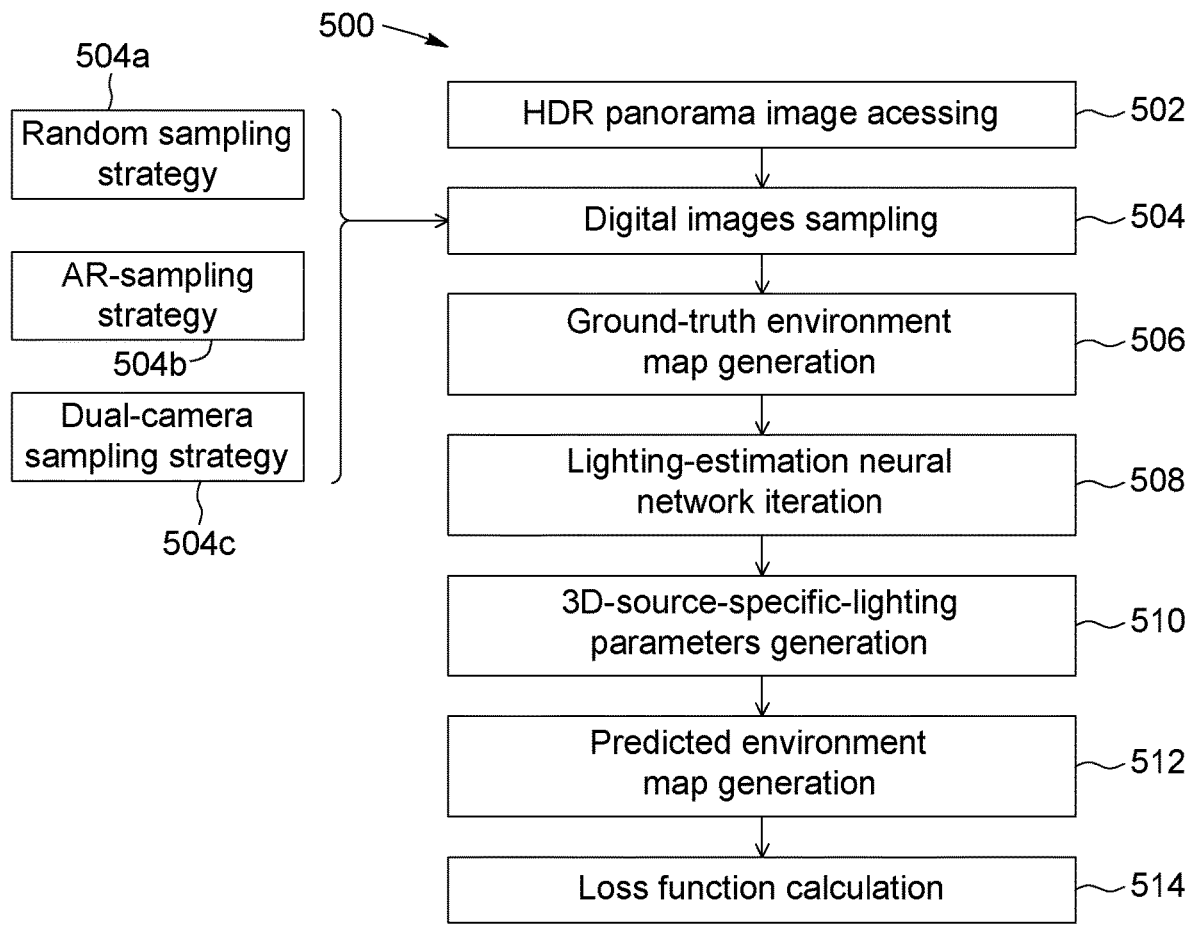
FIG. 6 is a flowchart of a lighting-estimation neural network training module, according to a possible embodiment.

Referring to FIG. 6, a multi-image training method 500 for training the lighting-estimation neural network is shown. A training dataset is used by the method 500. Step 502 comprises accessing the training dataset. In a possible embodiment, the training dataset is created from a plurality of HDR panorama images. Digital training images are sampled, or segmented, from the panorama images at step 504, each set of images sampled from a panorama image defining a sampling group, and the plurality of sampling groups defining the training dataset. For example, 2 to 5 images may be sampled into a sampling group from a single panorama image. The sampled images may additionally be processed, for example using tone mapping, to convert the HDR images into LDR images during this step. Different sampling strategies can be used to sample the digital training images, such as random sampling 504$a$, augmented-reality sampling 504$b$, and dual-camera sampling 504$c$. The number of sampled digital images from each panorama image may vary according to a minimum and a maximum number. An environment map, also referred to as a ground-truth environment map, is constructed at step 506 from each panorama image and comprises the lights sources of the panorama image. The sampled digital training images of a given panorama image corresponding to a scene, are processed by the lighting-estimation neural network, and lighting parameters, comprising 3D-source-specific-lighting parameters and an ambient parameter, are generated at step 510. From the lighting parameters, a predicted environment map is generated at step 510. In one embodiment, a loss function, based on a difference calculated between the ground-truth environment map and a predicted environment map, is calculated at step 512. The parameters of the lighting-estimation neural network and the parameters of the latent-rotation neural network may then be adjusted based on the loss function calculated at step 512. The multi-image training comprises multiple iterations of the steps described above, whereby the lighting-estimation neural network parameters and the latent-rotation neural network parameters are adjusted until the network has been satisfactorily trained, for example until the error on the estimated parameters are below a given threshold.

The latent-rotation neural network can be trained independently from the lighting-estimation neural network. A rotated dataset is prepared for the latent-rotation neural network training, the rotated dataset comprising digital images rotated according to predefined rotation angles and extracted from panorama images. The latent-rotation neural network uses the rotated dataset for its training, such that the images of the rotated dataset are processed through the latent-rotation neural network, and a loss function compares the predicted rotation angle with the known rotation angle, until the latent-rotation neural network is properly trained. In alternative embodiments, the images of the rotated dataset can be processed through the lighting-estimation neural network, and neural weights associated to neural network layers different from the latent-rotation neural network can be fixed so as to not be tuned during the training of the latent-rotation neural network.

Figure 7:
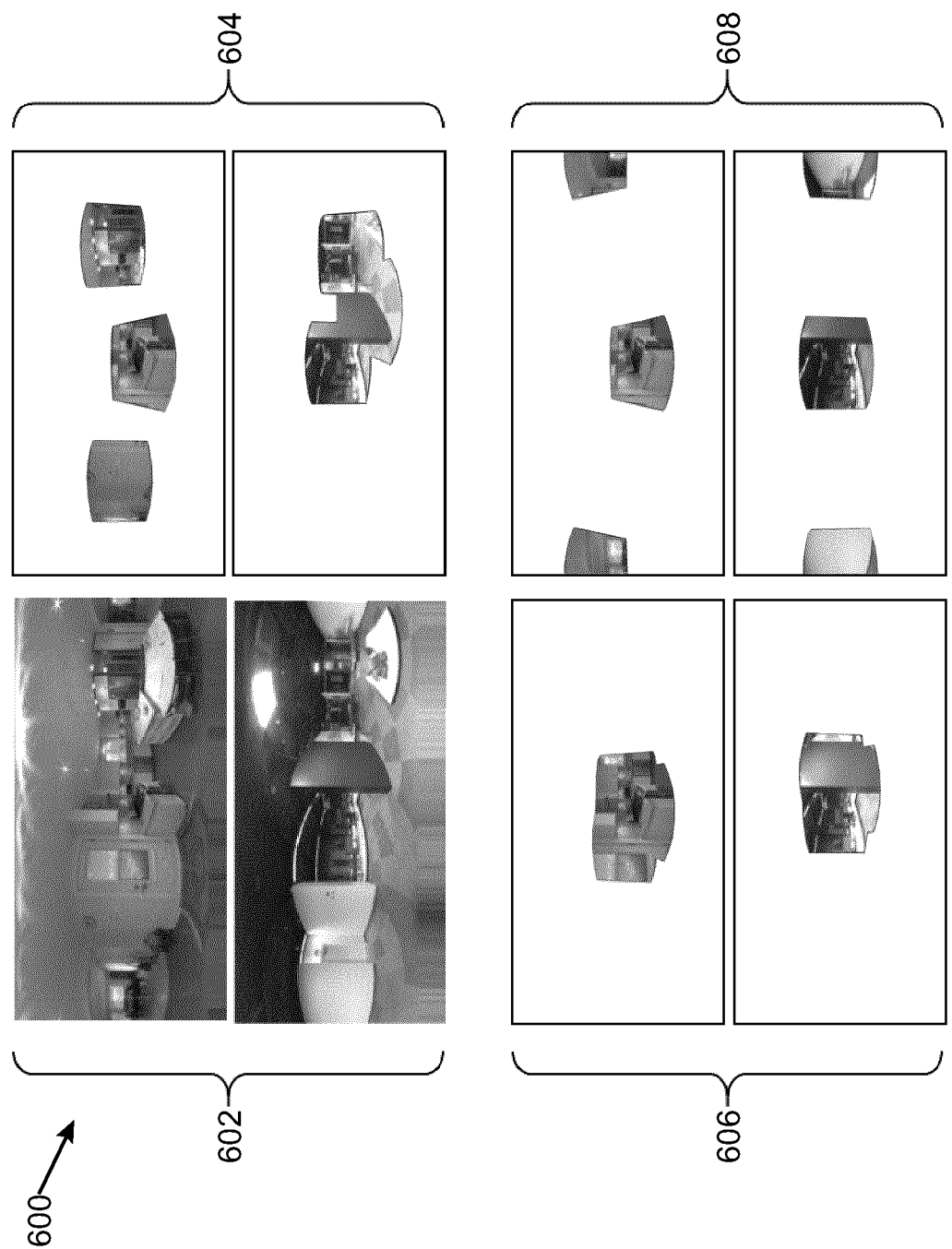
FIG. 7 is an illustration of sampling strategies used for training, according to possible embodiments 6

FIG. 7 illustrates different sampling methods used for training the lighting-estimation neural network. For example, three digital training images 604 are sampled from each of the HDR panorama images 602 according to a random sampling strategy. This may reflect a situation where the digital images are randomly captured around a room by a user. The number of samples (3) is only exemplary, as the random sampling strategy allows for sampling any number of digital images from a panorama image. The samples may be sampled from an HDR panorama image based on a uniform distribution of azimuth angles associated to the samples. Alternatively, any type of distribution of the azimuth angles can be used.

In other implementations, the digital training images can be sampled according to an Augmented-Reality (AR)-sampling strategy, where the images overlap one another. For example, three digital training images 606 are sampled according to the AR-sampling strategy for each of the HDR panorama images 602. The AR-sampling strategy allows for sampling the digital images within a maximum azimuth angle relative to a first sample. This may reflect augmented-reality applications where movements of the users are limited. The number of samples (3) is only exemplary, as the AR-sampling strategy allows for sampling any number of digital images from a panorama image.

In still another embodiment, two digital training images 608 are sampled from the HDR panorama images 602 according to a dual-camera sampling strategy. The azimuth delta separating the two digital images is 180°, for example, reflecting digital images taken from both sides of a smart phone or tablet, having back and front cameras. Other azimuth delta values can be used, such as 45° or 90°. The number of sampled digital images is fixed to two images for the dual-camera sampling strategy.

Figure 9:
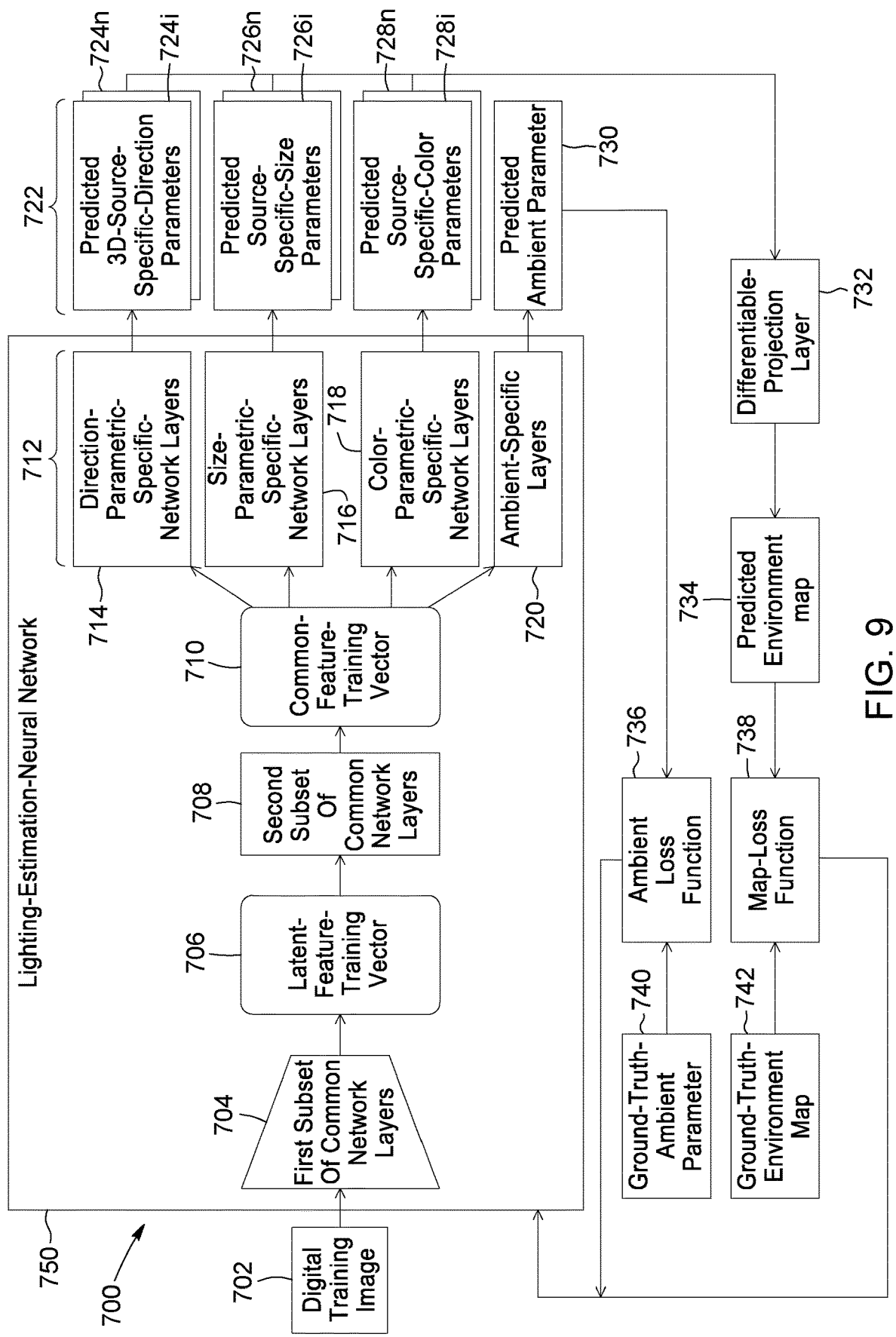
FIG. 9 is a schematic illustration of a stage of a single-image lighting-estimation neural network training method and system, according to a possible embodiment.
Figure 10:
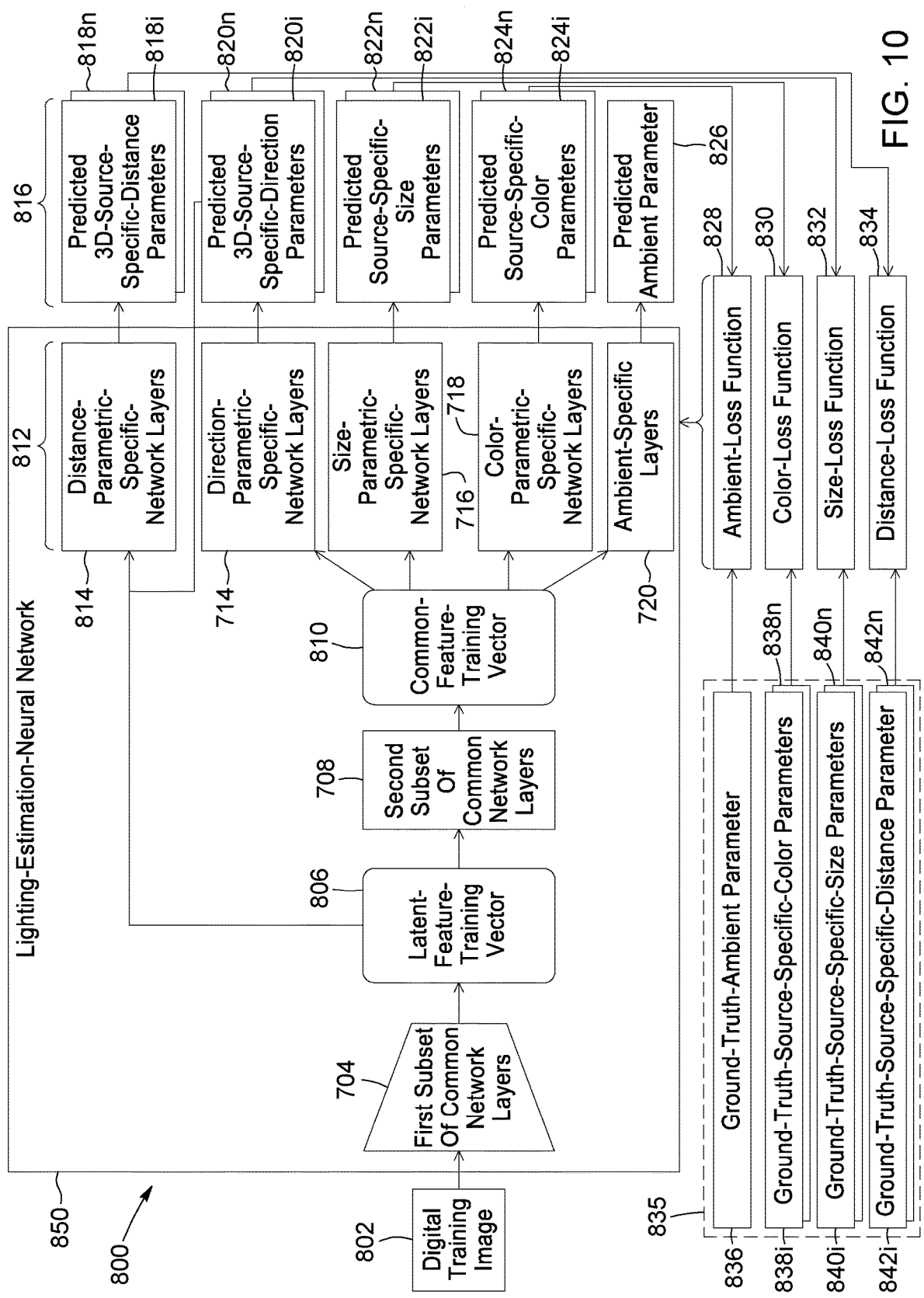
FIG. 10 is a schematic illustration of a second stage of the single-image lighting-estimation neural network training method and system, according to a possible embodiment.

An overview of the training steps for a single-image lighting-estimation neural network will be provided, with reference to FIGS. 9 and FIG. 10, since the single-image lighting-estimation neural network is advantageously used as the basis of the lighting-estimation neural network in a possible embodiment. To facilitate the training of the single-image lighting-estimation neural network, the lighting estimation system (identified as 300 in FIG. 4) accesses or generates ground-truth datasets. For example, the lighting estimation system can access a digital training image 702, 802, and generate, from the digital training image, a corresponding ground-truth-environment map 742, a ground-truth-ambient parameter 740, 836, ground-truth-source-specific-color parameters 838i-838n, ground-truth-source-specific-size parameters 840i-840n, and ground-truth-source-specific-distance parameters 842i-842n for training the single-image lighting-estimation neural network. By generating, from the digital training image, the corresponding ground-truth-environment maps and ground-truth-source-specific-training parameters, the lighting estimation system creates ground-truth datasets for training the single-image lighting-estimation neural network. Optionally, the lighting-estimation system may use an HDR panorama image for extracting a digital training image and generating a ground-truth-environment map and ground-truth-source-specific-lighting parameters corresponding to the digital image. For instance, in some embodiments, the lighting-estimation system uses HDR-panoramic images from the *Laval Indoor HDR Dataset* available online at indoor.hdrdb-.com and described by Marc-André Gardner et al., "Learning to Predict Indoor Illumination from a Single Image," Vol. 36, Article No. 6, ACM Transactions on Graphics (2017) (hereinafter, "Gardner"), the entire contents of which are incorporated by reference.

Referring to a first training stage of FIG. 9, after a digital training image 702 is processed through the single-image lighting-estimation neural network, the lighting-estimation system can use a differentiable-projection layer 732 to convert predicted lighting parameters 722 to a predicted environment map 734 for comparison with a ground-truth-environment map 742. By iteratively comparing predicted and ground-truth environment maps in iterations of the first training stage, the lighting-estimation system 300 avoids mismatching predicted lighting parameters with wrong light sources during early iterations. In a second training stage illustrated in FIG. 10, the lighting-estimation system 300 can generate and compare predicted lighting parameters 816 to ground-truth-lighting parameters 835. By comparing the predicted lighting parameters in iterations of the second training stage, the lighting estimation system can tune the parametric-specific-network layers to improve the predicted lighting parameters.

As shown in FIG. 9, for example, the lighting-estimation system processes a digital training image 702 through the lighting-estimation neural network 750 to generate predicted lighting parameters. The lighting-estimation neural network 750 comprises a first subset of common network layers 704 which encode the digital training image into a latent-feature-training vector 706. The lighting-estimation neural network 750 further comprises a second subset of common network layers which extract a common-feature-training vector 710 from the latent-feature-training vector 706. The common-feature-training vector 710 has a size smaller than the size of the latent-feature-training vector 706 in a possible embodiment. Parametric-specific-network layers 712 generate predicted lighting parameters 722 from the common-feature-training vector 710. The parametric-specific-network layers 712 comprise direction-parametric-specific-network layers 714, size-parametric-specific-network layers 716, color-parametric-specific-network layers 718 and ambient-specific layers 720 that generate respective predicted 3D-source-specific-direction parameters 724i-724n, predicted source-specific-size parameters 726i-726n, predicted source-specific-color parameters 728i-728n and predicted ambient parameter 730. During this first training stage, the distance-parametric-specific-network layers are deactivated. In other words, no gradient flows through the layers, and no tuning is performed on the layers, allowing for avoiding ambiguity in the earlier iterations of the training and allowing for detecting the different light sources.

The predicted 3D-source-specific-lighting parameters 724i-724n, 726i-726n, and 728i-728n can vary according to the number of predicted light sources. The lighting-estimation system further applies a differentiable-projection layer 732 to the predicted 3D-source-specific-lighting parameters 724i-724n, 726i-726n, and 728i-728n to project a predicted environment map 734 corresponding to the digital training image 702, and compares the predicted environment map 734 to a ground-truth-environment map 742 corresponding to the digital training image 702. By comparing environment maps, the lighting-estimation system 300 determines an environment-map loss using a map-loss function 738. Based on determining environment-map losses in multiple training iterations, the lighting-estimation system 300 iteratively modifies internal parameters of the lighting-estimation neural network 750 until a point of convergence.

Contrary to the predicted 3D-source-specific-lighting parameters 724i-724n, 726i-726n, and 728i-728n, the predicted ambient parameter 730 corresponds to an estimated remaining light in the digital training image 702 and is not variable as a function of the number of predicted light sources. For example, the predicted ambient parameter 730 may estimate ambient light in terms of RGB values and represent an average of remaining light within the digital training image 702—unassigned to a predicted light source. The error associated to the predicted ambient parameter 730 is therefore calculated separately from the predicted 3D-source-specific-lighting parameters 724i-724n, 726i-726n, and 728i-728n, and an ambient loss function 736 is used to determine ambient parameter loss between a ground-truth-ambient parameter 740 and the predicted ambient parameter 730.

In alternative embodiments, the predicted ambient parameter is used together with the predicted 3D-source-specific-lighting parameters to project the predicted environment map 734, instead of calculating an error separately from the predicted 3D-source-specific-lighting parameters.

After the first training stage, the lighting-estimation system 300 proceeds with a second training stage of training iterations. Referring now to FIG. 10, the lighting-estimation system 300 processes a digital training image 802 through the lighting-estimation-neural network 850 to generate the predicted lighting parameters 816.

The lighting-estimation neural network 850 includes distance-parametric-specific-network layers 814 as part of parametric-specific-network layers 812. The lighting-estimation neural network 750 depicted in FIG. 9 lacks such distance-parametric-specific layers. By adding the distance-parametric-specific-network layers 814, the lighting-estimation neural network 850 can output predicted 3D-source-specific-distance parameters 818i-818n estimating a distance of one or more predicted light sources during training iterations for the second training stage. In some embodiments, the distance-parametric-specific-network layers 814 comprise a distance-parameter-specific decoder that includes deconvolutional layers.

As suggested above, the lighting-estimation system iteratively inputs digital training images into the lighting-estimation neural network 850 for training during the second training stage. In an initial training iteration shown in FIG. 10, for example, the lighting-estimation system 300 feeds the digital training image 802 to the lighting-estimation neural network 850. As shown in FIG. 10 the lighting-estimation neural network 850 processes the digital training image 802 using the first subset of common network layers 704 to extract (or encode) a latent-feature-training vector 806. the lighting-estimation neural network 850 further processes the latent-feature-training vector 806 using the second subset of common network layers 708 to extract a common-feature-training vector 810.

The common-feature-training vector 810 is then processed through the parametric-specific-network layers 812 to generate predicted lighting parameters 816. For example, using the common-feature-training vector 810, the predicted 3D-source-specific--direction parameters 820i-820n are generated from the direction-parametric-specific-network layers 714, the predicted source-specific-size parameters 822i-822n are generated from the size-parametric-specific-network layers 716, the predicted source-specific-color parameters 824i-824n are generated from the color-parametric-specific-network layers 718, and the predicted ambient parameter 826 is generated from the ambient-specific layers 720.

In the embodiment of FIG. 10, the predicted 3D-source-specific-distance parameters 818i-818n are generated from the distance-parametric-specific-network layers 814. However, the inputs of the distance-parametric-specific-network layers 814 are the latent-feature-training vector 806 and the predicted 3D-source-specific-direction parameters 820i-820n. The lighting-estimation system 300 accordingly conditions the distance-parametric-specific-network layers 814 in the second training stage based on latent-feature-training vectors 806 and predicted 3D-source-specific-direction parameters 820i-820n.

As suggested above, sets of predicted 3D-source-specific-lighting parameters correspond to a predicted light source. For example, each set from the predicted 3D-source-specific-distance parameters 818i-818n estimates a distance of a predicted light source illuminating the digital training image 802 from a reference point, where a set of predicted 3D-source-specific-distance parameters 818i corresponds to a first light source and a set of predicted 3D-source-specific-distance parameters 818n corresponds to an additional light source. Similarly, each of the predicted 3D-source-specific-direction parameters 820i-820n, predicted the source-specific-size parameters 822i-822n, and the predicted source-specific-color parameters 824i-824n include a set corresponding to the first light source and a set corresponding to the additional light source. By contrast, the predicted ambient parameter 826 estimates remaining light in the digital training image 802 unassigned to a predicted light source.

After generating the predicted lighting parameters 816, the lighting-estimation system compares some of the predicted lighting parameters 816 to corresponding ground-truth-lighting parameters. As shown in FIG. 10, for example, the lighting-estimation system 310 uses an ambient-loss function 828 to compare the predicted ambient parameter 826 and a ground-truth-ambient parameter 836 to determine an ambient-parameter loss. The lighting estimation system 310 further uses a color-loss function 830 to compare the predicted source-specific-color parameters 824i-824n to the ground-truth-source-specific-color parameters 838i-838n to determine color-parameter losses. Similarly, the lighting-estimation system 310 uses a size-loss function 832 to compare the predicted source-specific-size parameters 822i-822n and ground-truth-source-specific-size parameters 840i-840n to determine size-parameter losses. Further, the lighting-estimation system uses a distance-loss function 834 to compare the predicted 3D-source-specific-distance parameters 818$i$-818$n$ and ground-truth-source-specific-distance parameters 842$i$-842$n$ to determine distance-parameter losses.

In some embodiments, the predicted 3D-source-specific-direction parameters 820$i$-820$n$ are not directly compared to ground-truth parameters since they are used to generate the predicted 3D-source-specific-distance parameters 818$i$-818$n$, and are therefore indirectly included in the comparison of the predicted 3D-source-specific-distance parameters 842$i$-842$n$ with the ground-truth-source-specific-distance parameters 842$i$-842$n$. In other embodiments, the predicted 3D-source-specific-direction parameters can be compared to ground-truth-source-specific-direction parameters. By comparing the specific-lighting parameters 826 with the ground-truth parameters 835, the lighting estimation system determines lighting parameter losses. Based on the determination of the lighting parameter losses in multiple training iterations, the lighting-estimation system 300 iteratively modifies internal parameters of parametric-specific-network layers 812 from the lighting-estimation neural network 850 until a point of convergence. In some embodiments, the lighting-estimation system may prevent internal parameters of the first subset of common network layers 704 and the second subset of common network layers 708 from being tuned during the second training stage. In other words, neural weights associated to the first and the second subsets of common network layers 704 and 708 are fixed to avoid modification.

The lighting-estimation system optionally determines an overall loss based on a combination of two or more of the ambient-loss function 828, the color-loss function 830, the size-loss function 832, or the distance-loss function 834.

During the second training stage, the lighting-estimation system can use the lighting-estimation neural network 850 to iteratively generate predicted 3D-source-specific-lighting parameters 818$i$-818$n$, 820$i$-820$n$, 822$i$-822$n$, and 824$i$-824$n$ and predicted ambient parameters 826 based on digital training images. The lighting-estimation system also can iteratively compare such predicted lighting parameters to ground-truth lighting parameters 835 to determine corresponding losses.

Training of the Angle-Estimation Network

Figure 12:
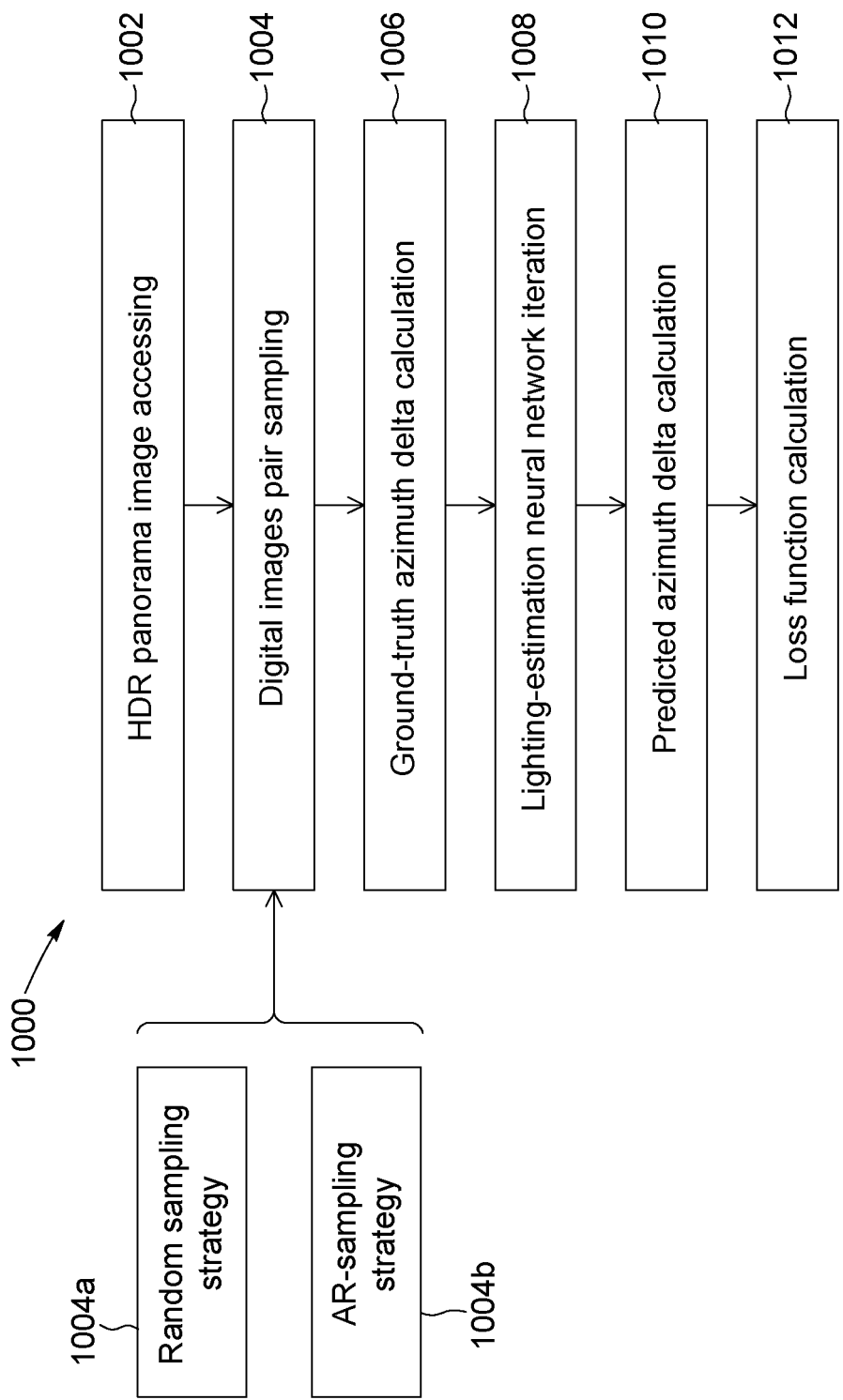
FIG. 12 is a flowchart of steps of angle-estimation network training, according to an embodiment.

In possible implementations, the angle-estimation network must be trained to estimate the azimuth angle between two captured images, for cases where the angle between the images is not already known. The angle-estimation network is preferably trained separately from the lighting-estimation neural network. In other words, training the angle-estimation network is "disjointed", such that errors in estimating the angles during the training of the angle-estimation network is not propagated to the lighting parameter estimation network. This avoids negatively impacting the training of a latent-rotation neural network, since the latent-rotation neural network uses the output of the angle-estimation network as an input. Alternatively, a trained lighting-estimation neural network can be used. For training the angle-estimation network, a pre-trained lighting-estimation neural network is used. Referring to FIG. 12, the angle-estimation network training steps 1000 are shown. HDR panorama images, accessed at step 1002. Pairs of digital training images are sampled from the HDR panorama images at step 1004 with a defined ground-truth azimuth delta between the two digital images (step 1006). The digital training images are processed by the pre-trained light-estimation neural network at step 1008, wherein the angle-estimation network generates a predicted azimuth delta. A loss function calculating the difference between the estimated angle and the ground-truth angle is used at step 1012 for determining the estimation error. In an embodiment, an L2 loss function, used to minimize the error defined as the sum of the squared difference between the ground-truth angle and the estimated angle, is applied. By convention, and as an example only, the estimated angle can be evaluated for the second digital training image with respect to the first digital training image. Symmetry over the estimations is enforced by evaluating the loss for reverse cases where the estimated angle is evaluated for the first digital training image with respect to the second digital training image. This is expressed by $S(z_1, z_2) = -S(z_1, z_2)$ $F(\{I_1, z_1\}, \{I_2, z_2\}) = -F(\{I_2, z_2\}, \{I_2, z_2\}, \{I_1, z_1\})$ where S corresponds to the slim angle-estimation network, F corresponds to the full angle-estimation network, $z_x$, is a latent feature vector and $I_x$ is a digital image.

The digital training images processed by the lighting-estimation neural network used for the angle-estimation network are sampled according to the random sampling strategy 1004$a$ or the AR-sampling strategy 1004$b$. The dual-camera sampling strategy is not used since the azimuth delta between two digital images is implicit using that strategy.

Results

Figure 8:
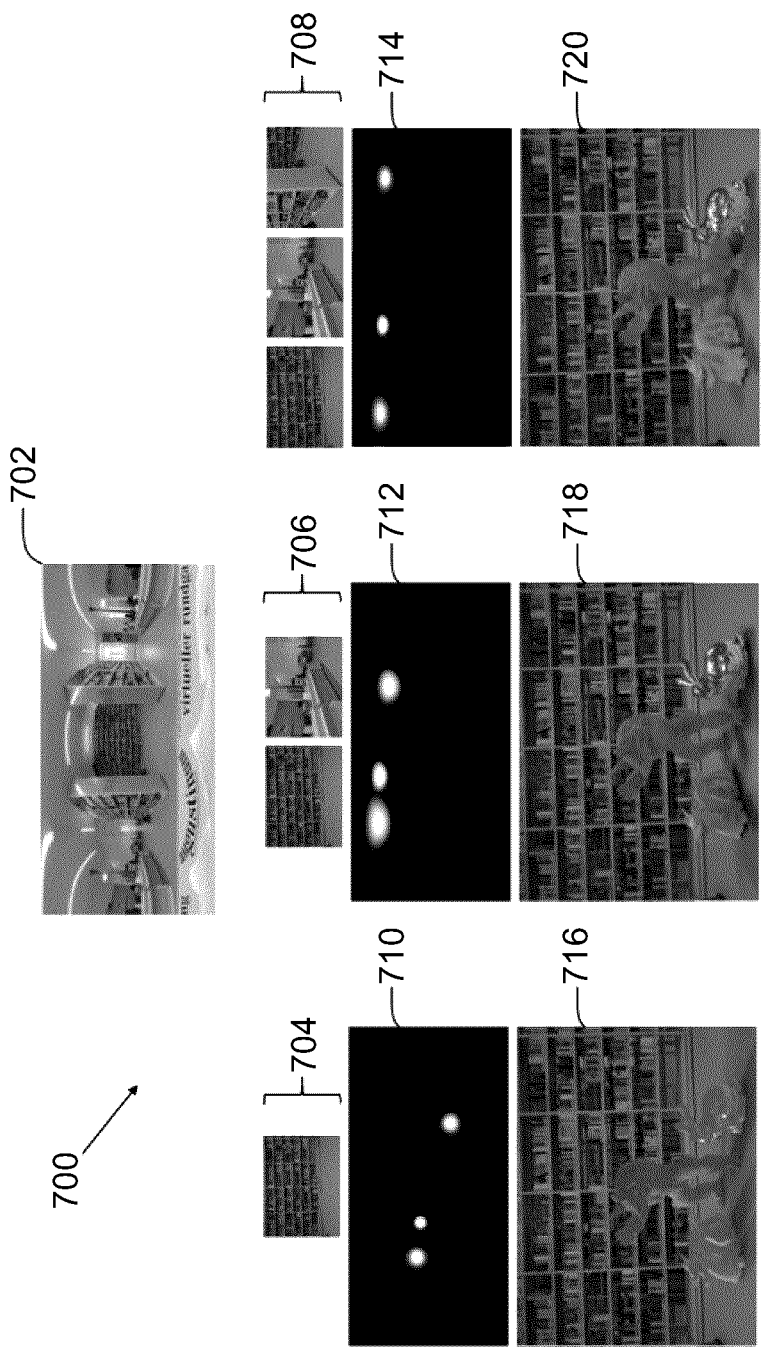
FIG. 8 show comparative results of images rendered with virtual objects illuminated using 3D-lighting parameters determined using the proposed lighting-estimation system, wherein the results are provided for inputs of one, two, and three images to the lighting-estimation neural network.

FIG. 8 shows a comparison of different renderings of virtual objects within a digital image created using the lighting estimation system 300. From a digital HDR panorama image 702, three different renderings are presented. In a first rendering, a single digital image 704 is sampled from the digital HDR panorama image 702, the single image being the digital image in which the virtual object is rendered. Image 710 is a representation of the 3D-source-specific parameters detected by the lighting-estimation neural network, where three light sources are visible. The rendering 716 is based on the 3D-source-specific parameters applied to the virtual object.

In a second rendering, two digital images 706 are sampled from the digital HDR panorama image 702, where the first digital image is used for the rendering. Image 712 is a representation of the 3D-source-specific parameters detected by the lighting-estimation neural network, where three light sources are visible, but their characteristics are different from the first rendering. The rendering 718 is based on the 3D-source-specific parameters applied to the virtual object.

In a third rendering, three digital images 708 are sampled from the digital HDR panorama image 702, where the first digital image is used for the rendering. Image 714 is a representation of the 3D-source-specific parameters detected by the lighting-estimation neural network, where three light sources are visible, but their characteristics are different from the first and the second renderings. The rendering 720 is based on the 3D-source-specific parameters applied to the virtual object.

As can be appreciated, when two or three images are used, the light sources are better positioned, thereby improving the lighting prediction accuracy. In addition, in the case where three images are used, the predicted colors on the virtual objects are improved.

Of course, numerous modifications could be made to the embodiments described above without departing from the scope of the present disclosure. It will be understood that even though only some of the embodiments of the present application are described, any combination of the different embodiments is possible.

The invention claimed is:

1. A computer-implemented method for estimating lighting conditions of a scene captured from a plurality of digital images, the scene being illuminated by one or more light sources, the method comprising the steps of:
   a) accessing the plurality of digital images of the scene, the plurality of images sharing substantially the same projection center;
   b) generating, using a lighting-estimation neural network, lighting parameters of the scene comprising at least 3D-source-specific-lighting parameters, wherein the lighting-estimation neural network is configured for:
      i. extracting from the plurality of images a corresponding number of latent feature vectors, using instances of a first subset of common network layers of the lighting-estimation neural network;
      ii. transforming the latent feature vectors into common-coordinates latent feature vectors, using instances of a latent-rotation neural network, wherein the common coordinates are relative to the scene;
      iii. merging the plurality of common-coordinates latent feature vectors into a single latent feature vector,
      iv. extracting, from the single latent feature vector, a common-feature vector, using a second subset of the common network layers of the lighting-estimation neural network;
      v. generating the lighting parameters of the scene, by inputting the common-feature vector through a plurality of parametric-specific-network layers of the light-estimating neural network, the 3D-source-specific-lighting parameters being associated with respective ones of the light sources detected by the lighting-estimation neural network.

2. The computer-implemented method of claim 1, wherein:
   step a) comprises receiving N digital images of the scene, each digital image having been captured at an azimuth angle ON, wherein one of said digital images is a reference image with a reference azimuth Oo;
   step b) i) comprises inputting the N digital images into N instances of the first subset of common network layers, and generating therefrom N latent feature vectors, one of said feature vector being a reference latent feature vector;
   step b) ii) comprises inputting N-1 latent feature vectors and their associated azimuth angles relative to the reference azimuth Oo into respective instances of the latent-rotation neural network, whereby the transformed N-1 latent feature vectors and the reference feature vector, result in N common-coordinates latent feature vectors; and
   step b) iii) comprises inputting the N common-coordinate latent feature vectors into the pooling layer of the light-estimating neural network.

3. The computer-implemented method of claim 2, wherein the azimuth angles ON of the digital images are estimated using a plurality of instances of an angle-estimation neural network.

4. The computer-implemented method of claim 3, wherein the angle-estimation neural network comprises a slim angle-estimation network comprising fully-connected layers, and wherein estimating the azimuth angle ON of a given one of the digital images comprises inputting the corresponding latent feature vector of said image and the reference latent feature vector to the trained slim angle-estimation network.

5. The computer-implemented method of claim 3, wherein the angle-estimation neural network comprises a full angle-estimation network based on a convolutional neural network (CNN) architecture with fully-connected layers, and wherein estimating the azimuth angle $\theta_N$ of a given one of the digital images comprises inputting into the trained full angle-estimation neural network:
   the corresponding latent feature vector of said image;
   the reference latent feature vector associated to the reference image; and
   said given one image and said reference image.

6. The computer-implemented method of claim 1, wherein the first subset of the common network layers comprises an encoder neural network.

7. The computer-implemented method of claim 1, wherein the latent-rotation neural network comprises at least one fully-connected layer of a size matching a size of the latent feature vectors.

8. The computer-implemented method of claim 1, wherein the azimuth angles ON of the images are determined based on image information provided by the image-capture device used for capturing the digital images.

9. The computer-implemented method of claim 1, wherein merging the plurality of common-coordinates feature vectors is performed by using a pooling layer of the light-estimating neural network.

10. The computer-implemented method of claim 1, wherein the pooling layer is a maximum pooling layer or an average pooling layer, and comprises one or more fully-connected layers.

11. The computer-implemented method of claim 1, wherein the parametric-specific-network layers generate, for each of the light sources detected by the lighting-estimation neural network, at least one of:
   a. a 3D-source-specific-distance parameter estimating a distance of the light source from a reference point;
   b. a 3D-source-specific-direction parameter estimating a direction of the light source with respect to the reference point;
   c. a source-specific-size parameter estimating a size of the light source;
   d. a source-specific-color or intensity parameter estimating a color of the light source.

12. The computer-implemented method of claim 1, wherein the lighting parameters further comprise an ambient parameter representative of an overall illumination of the digital images when light sources are removed, and wherein the parametric-specific-network layers generate the ambient parameter.

13. The computer-implemented method of claim 1, wherein the parametric-specific-network layers are fully-connected specific-network decoder layers, and wherein output sizes of the parametric-specific-network layers vary according to parameter type and a number of light sources detected.

14. The computer-implemented method of claim 1, wherein the 3D-source-specific-direction, source-specific-size and source-specific-color parameters corresponding to any one of the light sources are generated based on the common-feature vector.

15. The computer-implemented method of claim 1, wherein the 3D-source-specific distance parameter corresponding to one of the light sources is generated based on the common latent feature vector and the 3D-source-specific-direction parameter corresponding to the light source.

16. The computer-implemented method of claim 1, further comprising a step of rendering at least one modified digital image comprising a virtual object illuminated according to the generated 3D-light parameters.

17. A system for estimating lighting conditions of a scene expressed as lighting parameters comprising at least three-dimensional (3D)-source-specific-lighting parameters, the system comprising:
   a. a module for accessing a plurality of digital images of a scene sharing substantially the same projection center;
   b. a trained lighting-estimation neural network for generating the 3D-source-specific-lighting parameters of the scene, the trained lighting-estimation neural network configured to:
      i. extract a plurality of latent feature vectors, using a plurality of instances of a first subset of common network layers of the lighting-estimation neural network, corresponding to the plurality of digital images;
      ii. transform, using a plurality of instances of a trained latent-rotation neural network, the plurality of latent feature vectors into common-coordinates latent feature vectors, wherein the common coordinates are relative to the scene;
      iii. merge, using a pooling layer, the plurality of common-coordinates latent feature vectors into a single latent feature vector;
      iv. extract, using a second subset of the common network layers of the lighting-estimation neural, a common feature vector from the single latent feature vector;
      v. generate, using a plurality of parametric-specific-network layers, the 3D-source-specific-lighting parameters of the scene for each of light sources predicted by the lighting-estimation neural network.

18. The system of claim 17, wherein the lighting parameters further comprise an ambient parameter, and wherein step v. comprises generating the ambient parameter.

19. The system of claim 17, further comprising a rendering module, to render at least one modified image of the plurality of digital images, the modified image comprising a virtual object at a given position in said image, the virtual object being illuminated according to the lighting parameters.

20. The system of claim 17, further comprising an angle-estimation module for estimating the azimuth angles $\theta_N$ of the images using a plurality of instances of angle-estimation networks.

21. A computer-implemented method for estimating lighting conditions of a scene captured from a plurality of digital images, the scene being illuminated by one or more light sources, the method comprising:
   generating 3D-source-specific-lighting parameters of the scene using a lighting-estimation neural network configured for:
      extracting from the plurality of images a corresponding number of latent feature vectors;
      transforming the latent feature vectors into common-coordinates latent feature vectors;
      merging the plurality of common-coordinates latent feature vectors into a single latent feature vector;
      extracting, from the single latent feature vector, 3D-source-specific-lighting parameters of the scene.

* * * * *